United States Patent
Kesavareddigari et al.

(10) Patent No.: US 12,219,346 B2
(45) Date of Patent: Feb. 4, 2025

(54) MITIGATING MISINFORMING ROGUE ACTORS IN PERCEPTIVE WIRELESS COMMUNICATIONS

(71) Applicant: QUALCOMM Incorporated, San Diego, CA (US)

(72) Inventors: Himaja Kesavareddigari, Bridgewater, NJ (US); Kapil Gulati, Belle Mead, NJ (US); Hong Cheng, Basking Ridge, NJ (US); Qing Li, Princeton Junction, NJ (US); Kyle Chi Guan, New York, NY (US); Mahmoud Ashour, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 18/069,988

(22) Filed: Dec. 21, 2022

(65) Prior Publication Data
US 2024/0214797 A1    Jun. 27, 2024

(51) Int. Cl.
*H04W 12/00* (2021.01)
(52) U.S. Cl.
CPC .................. *H04W 12/009* (2019.01)
(58) Field of Classification Search
CPC .................. H04W 12/009; H04W 4/38
See application file for complete search history.

(56) References Cited

U.S. PATENT DOCUMENTS

| | | | |
|---|---|---|---|
| 11,595,437 B1* | 2/2023 | Mushtaq | H04L 63/1483 |
| 2021/0026722 A1* | 1/2021 | Bhatia | G06F 11/079 |
| 2022/0337601 A1* | 10/2022 | Serna | H04L 63/1416 |
| 2023/0123632 A1* | 4/2023 | Karpovsky | H04L 63/1425 726/23 |
| 2023/0135485 A1* | 5/2023 | Sesha | H04L 41/16 701/117 |
| 2023/0171274 A1* | 6/2023 | Muthuswamy | H04L 41/0866 726/22 |

OTHER PUBLICATIONS

Feng-Ke Tsai et al, "Sensor Abnormal Detection and Recovery Using Machine Learning for IoT Sensing Systems", 2019, IEEE, IEEE 6th International Conference on Industrial Engineering and Applications, pp. 501-505 (Year: 2019).*

* cited by examiner

*Primary Examiner* — Clayton R Williams
(74) *Attorney, Agent, or Firm* — Procopio, Cory, Hargreaves & Savitch LLP

(57) ABSTRACT

An apparatus may be a UE configured to receive, from a network entity associated with a machine learning procedure, a first indication that a first set of data elements transmitted by the wireless device at a first time is categorized as misinformation and that, based on the categorization of the first set of data elements as misinformation, the network entity will temporarily exclude data from the wireless device from propagation as input for a subsequent machine learning procedure. The apparatus may further be configured to receive a second indication of a set of criteria for requesting a reevaluation of the categorization and transmit, based on meeting one or more criteria in the set of criteria, a second set of data elements to the network entity at a second time.

30 Claims, 16 Drawing Sheets

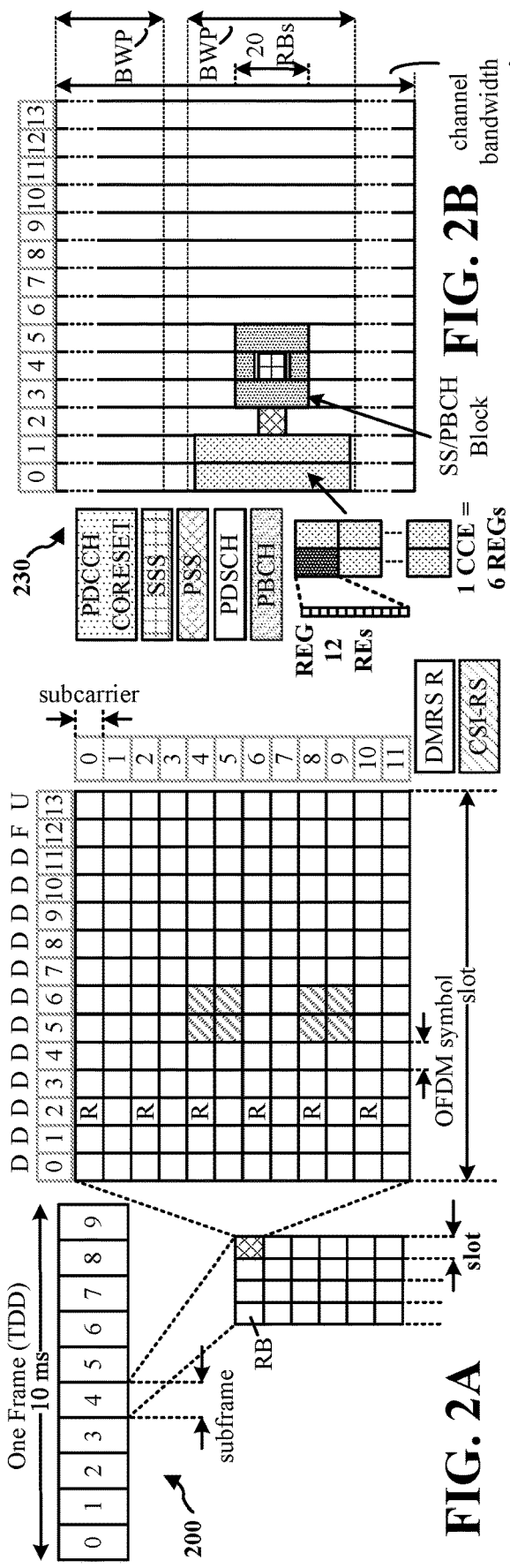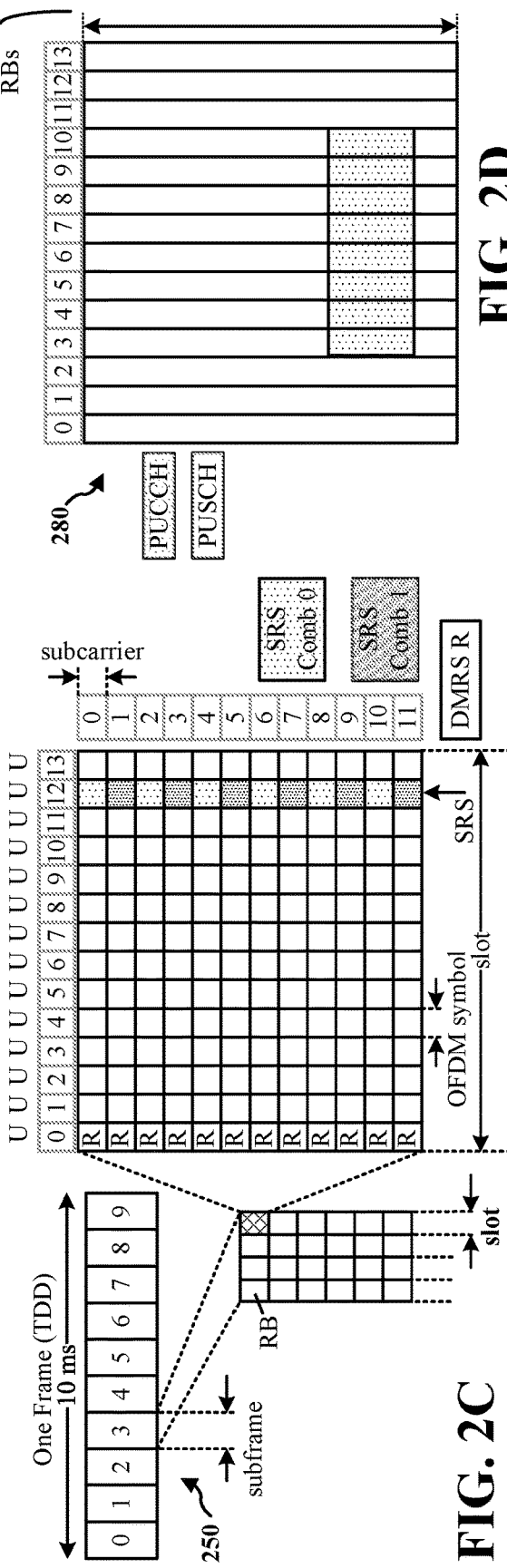
FIG. 2A
FIG. 2B
FIG. 2C
FIG. 2D

MITIGATING MISINFORMING ROGUE ACTORS IN PERCEPTIVE WIRELESS COMMUNICATIONS

TECHNICAL FIELD

The present disclosure relates generally to communication systems, and more particularly, to perceptive wireless communications. More specifically, the present disclosure relates to maintaining data quality for perceptive wireless communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus in certain aspects may be configured to receive, from a network entity associated with a machine learning procedure, a first indication that a first set of data elements transmitted by the wireless device at a first time is categorized as misinformation and that, based on the first set of data elements being categorized as misinformation, the network entity will temporarily exclude the current data elements and any future data elements received from the wireless device from propagation as input for the subsequent stages of a machine learning procedure or other analysis of data elements. The apparatus may further be configured to receive a second indication of a set of criteria for requesting a reevaluation of the categorization and transmit, based on meeting one or more criteria in the set of criteria, a second set of data elements to the network entity at a second time.

In an aspect of the disclosure, a method, a computer-readable medium, and an apparatus are provided. The apparatus in certain aspects may be configured to transmit, for a first wireless device, a first indication that a first set of data elements has been categorized as misinformation and that, based on the first set of data elements being categorized as misinformation, the network entity will temporarily exclude data from the first wireless device from propagation as input for a subsequent machine learning procedure. The apparatus may further be configured to transmit, for the first wireless device, a second indication of a first set of criteria for requesting a reevaluation of the categorization by the first wireless device and configure a second set of criteria for performing a reevaluation of the categorization by the network entity. The apparatus may further be configured to receive a second set of data elements from the first wireless device at a second time after satisfying one or more criteria in the first set of criteria for requesting reevaluation by the wireless device or in the second set of criteria for initiating a reevaluation by the network device have been met.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
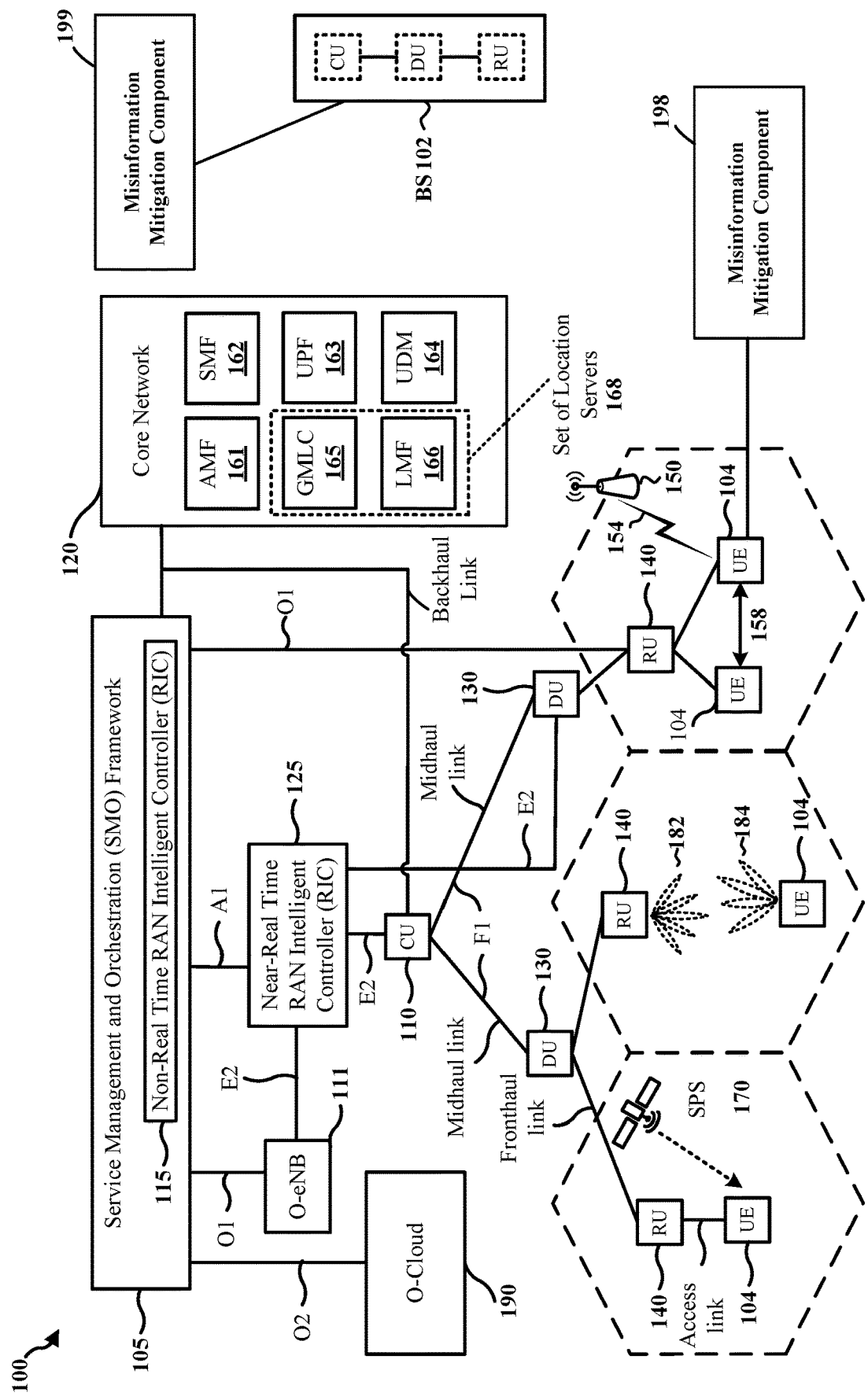
FIG. 1 is a diagram illustrating an example of a wireless communications system and an access network.

In some aspects of wireless communication, a communication network may include perceptive wireless communication components. There may be various classifications for actors in the perceptive wireless communication components, e.g., indicating whether an actor provides accurate/reliable data or inaccurate/unreliable data. In other aspects, the classification may indicate whether the inaccurate/unreliable data is unintentional, e.g., non-malicious due to a sensor error, or intentional from a malicious actor. Aspects presented herein enable a re-classification framework for updating classifications as conditions associated with a classification change over time.

Perceptive wireless communication may relate to communication systems that are assisted by the perception of the physical environment/world. The perception of the physical environment/world, in some aspects, may include, e.g., measurement data and machine learning feature data gathered from vehicular (or other device) sensors, e.g., radio assisted detection and ranging (RADAR), light detection and ranging (LIDAR), cameras, Global Navigation Satellite System (GNSS), inertial measurement unit (IMU) sensors. Communications tasks that benefit from perception, in some aspects, include beam management, beam blockage prediction, beam refinement, etc. Perceptive wireless communication (e.g., associated with a wireless communication system providing a wireless communication service) may be affected by incorrect and/or misleading information from associated devices (and/or device components).

As a non-limiting example of perceptive wireless communication, sensing-related measurement data and feature data (e.g., data regarding a physical environment or objects in a surrounding environment) gathered from vehicles, may be combined with communications-related measurements and feature data to improve and/or refine the quality and/or efficiency of the communication systems. Perceptive wireless communication, thus, may involve reliable coordination, at multiple stages, between multiple independent agents/actors. In some aspects, the actors may include pedestrian UEs (e.g., associated with a vulnerable road user or VRU), in-vehicle UEs, vehicles, vehicular sensors, GPS devices, and/or other similar devices providing data for processing by (or propagating through) one or more artificial intelligence (AI)/machine learning (ML) (AI/ML) training/inference servers and/or agents.

In some aspects, generative and/or discriminative learning may be used to identify (or classify) actors as honest (e.g., non-malicious) or malicious and may further be used to identify honest actors as being rogue (e.g., providing inaccurate information) or non-rogue (e.g., providing reliable/accurate information). In some aspects, a rogue actor may be referred to as an inaccurate actor, and a non-rogue actor may be referred to as an accurate actor. Other names or information properties or classifications may be used to distinguish between sources of accurate information and sources of inaccurate information.

An actor, in some aspects, may be an independent, active component contributing to the perceptive wireless communication (e.g., a particular perceptive wireless communication task). According to one or more examples, the rogue actor may be any of a sensor data collector (SDC), a vehicle along with its onboard sensors, an in-vehicle cellular UE, a pedestrian UE, and/or an ML training/inference host (e.g., a local component at a UE that processes data). Actors may be defined at different levels of granularity, e.g., a vehicle (together with its onboard sensors) may be an actor at a first level of granularity and/or a single SDC on the same vehicle could be another actor at a second level of granularity.

Actors may be classified as one of a plurality of different types of actors, e.g., as honest (non-rogue) actors, non-malicious (misinforming or unintentional) rogue actors, or malicious (disinforming or intentional) rogues and that the methods below may be applied to disinforming rogue actors. An honest actor may refer to an actor or device that provides accurate/correct information to the network or to another device in the network, and may also be referred to as a non-rogue actor or device.

In some aspects, rogue actors may include actors providing inaccurate, misleading, or false information. The inaccurate, false, or misleading information may also be referred to as misinformation, disinformation, or unreliable information. There may be different types of rogue actors. For example, some rogue actors may unintentionally (e.g., without being aware that the data is inaccurate, false, or misleading) provide inaccurate or misleading information to the network, such as location information from the GNSS sensor of a vehicle during a period of acceleration. Accurate information may also be referred to as reliable information. A rogue actor that unintentionally provides inaccurate, false, or misleading data may be referred to as a non-malicious rogue actor. Another type of rogue actor or device may intentionally provide inaccurate, false, or misleading information, and may be referred to as a malicious rogue actor.

Rogue actors (actors whose information has errors with high mean and/or high-variance; actors whose information is misleading, incorrect, inaccurate, mistaken, corrupted, and/or deceptive) can introduce or cause error propagation at multiple stages of a perceptive wireless communication procedure. A rogue actor may supply incorrect information to the process either deliberately, based on a failed sensor, and/or based on tampering by an external agent. Incorrect information, in some aspects may be supplied unintentionally and may be based on a more transitory basis than disinformation, for example, based on a transitory situation/context such as during a maneuver that causes one or more types of information to be incorrect or misleading. Intentional inaccurate or incorrect information may be referred to as disinformation, whereas unintentional inaccurate/incorrect information may be referred to as misinformation. In some aspects, for a misinforming actor, other (non-rogue) actors (e.g., UEs) in the same environment and/or context, having received a same configuration from the network as the misinforming actor, may send incorrect values for the same data element with a (same) non-zero probability. In other words, a misinforming actor may be a non-malicious actor such that other non-malicious actors in a similar (or same) location receiving a same configuration from the network would be likely (with a non-zero probability) to provide incorrect information. However, for a disinforming actor, other (non-rogue) actors (e.g., UEs) in the same environment and/or context, having received a same configuration from the network as the disinforming actor, may transmit incorrect values for the same data element with probability nearing zero. For example, a disinforming actor may be a malicious actor such that non-malicious actors in a similar (or same) location receiving a same configuration from the network would not be likely to provide incorrect information (e.g., with a probability near zero).

The misleading or incorrect information (e.g., misinformation) may include a set of data elements (e.g., information from one or more components of an actor that may be communicated to other devices) including one or more of raw sensing data, bounding boxes (indicating a spatial extent of an identified object), and other features extracted from onboard ML models, UE/wireless device location, UE/wireless device orientation/velocity, and/or beam measurements at the UE. For either disinformation or misinformation, incorrect outputs (data elements received from a rogue actor) at a first operation (or to a first network, or wireless, device) may lead to incorrect inputs/outputs at the next operation (or for another network, or wireless, device) of a perceptive wireless communication task. For example, incorrect information relating to bounding boxes of different objects in a first environment may lead to an incorrect beam blocking prediction. Therefore, one or more rogue actors can severely degrade the benefits of coordination among multiple actors, most of which may not be rogue actors. The ability to produce accurate results in the presence of such rogue actors may improve the usefulness (e.g., accuracy) of the perceptive wireless communication.

A rogue actor may supply incorrect information to the process either deliberately or unintentionally (e.g., based on a failed sensor or other situational/contextual issues). For either disinformation or misinformation, incorrect outputs (data elements received from a rogue actor) from one operation may lead to incorrect inputs/outputs at a related operation. For example, incorrect information relating to bounding boxes of different objects in a first environment may lead to an incorrect beam blocking prediction. In some aspects, misinformation may be caused by intermittent occlusion of a sensor in consecutive time instants leading to inconsistent estimates of the environment, or a (rapidly) changing location, velocity, and/or relative position of elements and/or devices in the environment. In some aspects, each vehicle may be assumed to have a central computing and/or memory equipment that is independent of the onboard computer and may be assumed to be tamper-proof. Unlike the case of misinformation, a sensor may not be counted as an independent actor in the case of disinformation. In some aspects, the disclosure is based on (1) a central network entity such as a base station that operates without external tampering (e.g., is tamper-proof), (2) one or more vehicular UEs that have central equipment that operate without external tampering (e.g., is tamper-proof) or that are assumed tamper-proof (e.g., cannot be modified by an external source), and (3) that trusted vehicular UEs can maintain the access permissions of their own onboard sensors and computers. For example, as long as the vehicle is not rogue (e.g., the central equipment remains untampered and/or unmodified), the vehicle may control the exclusion of any disinforming sensors (including tampered or damaged sensors). The vehicle control of the exclusion may be indicated to the vehicle by a network entity in a wireless network. The vehicle control of the exclusion may be indicated to the vehicle by a network entity in a wireless network, and the vehicle may in turn, indicate to a central network entity in a wireless network for the central network entity to exclude the information associated with the disinforming sensors.

For the following discussion, it may be assumed the actors have already been classified between different types of actors as honest (non-rogue), non-malicious (misinforming or unintentional) rogues, or malicious (disinforming or intentional) rogues) and that the methods below may be applied to disinforming rogue actors. In some aspects, generative and/or discriminative learning may be used to identify (or classify) actors as honest, non-malicious, or malicious and may further be used to identify actors as being rogue (e.g., providing misinformation) or non-rogue (e.g., providing reliable information). In some aspects, non-malicious may generally refer to both misinforming and honest actors as neither purposely provides incorrect or misleading information. In some aspects, a rogue actor may be referred to as an inaccurate actor, and a non-rogue actor may be referred to as an accurate actor. Other names or classifications may be used to distinguish between sources of accurate information and sources of inaccurate information. In some aspects, generative and/or discriminative learning may include learning the distribution of incoming data for each environment and subsequently identifying outliers. The generative learning model may include one or more of generative adversarial networks (GANs), variational autoencoders (VAEs), or other generative/discriminative algorithms.

For example, a generator network, G, may learn a distribution of the external incoming dataset/datastream and generate a sample (for a given noisy seed) with the aim of making it indistinguishable from the external incoming dataset to a discriminator network. D. The discriminator network. D, may be used, for a given input (picked arbitrarily from either G or the dataset), to learn and return a likelihood that the input is drawn from the dataset/datastream and is not a creation of the generator G.

Accordingly, training the rogue identification modules could involve training (1) a unique generator $G_0$ with multiple $D_n$'s, (2) multiple $G_m$-$D_n$ pairs, and (3) multiple $G_m$'s with one $D_0$ acting as classifier (uniquely-trained $G_m$'s for highway, intersections, etc.) Further, a rogue identification module might be trained to individually identify errors at each stage of the beam management procedure and jointly identify multiple errors accumulated over multiple stages of the beam management procedure.

For a disinforming rogue actor, the errors may be assumed to be permanent (or effectively permanent or near-permanent) such that the disinforming rogue actor may be permanently blocked (e.g., access permission may be permanently revoked). The permanent blocking may include placing an identifier of the disinforming rogue actor into a list, database, or other data structure of blocked actors. The system, in some aspects, may not provide a time-based criteria for reassessment. In some aspects, reassessment criteria may be provided that relate to replacement or repair of the rogue components or actors (e.g., malfunctioning sensors, in-vehicle cellular UEs, etc.). The disinformation may take the form of (or may be implemented by the disinforming rogue actor as) modified packets (e.g., transmitted information) and/or packets designed to imitate valid packets from the actor. The modification and/or imitation, in some aspects, may involve one or more of (1) spoofing or utilizing the identifying information of another actor, (2) matching a location, speed, RSRP, or other characteristic (e.g., a past and/or out of date value) associated with the disinforming rogue actor, (3) distorting machine learning outputs (such as bounding boxes, their confidences), and/or (4) modifying packets, delaying packets and/or creating duplicates of packets (e.g., for V2V communications). In some aspects, the disinformation may lead to (or be intended to lead to) reallocation of cellular resources, traffic jams, and accidents.

In some aspects, detection of intentional tampering by a disinforming rogue actor may be identified and/or detected by a combination of AI/ML and non-AI/ML algorithms trained to detect evidence of tampering from the incoming sensing and other quantitative data. For example, fabricated sensing images and/or measurement data may be detected by GANs, VAEs, or other generative/discriminative algorithms. In some aspects altered packets (checksum) and/or duplicated or imitated packets (sensing data, history) may be detected by dedicated algorithms. Based on the detection and/or identification, permission may be revoked for the source of tampered information. By revoking the permission, the system and/or network entity may prevent information received from the disinforming rogue actor from being accepted as input for propagation and/or processing by the network entity or network function associated with the network entity.

In some aspects, if an actor is classified as a disinforming rogue by the classifier its access permissions may be revoked. The access permission revocation, in some aspects, may be achieved by placing the actor on an access list (e.g., a block or restricted access list). In some aspects, the access list may be used to manage access to a set of service entities that utilize information collected from multiple UEs to improve wireless communication or provide services to the individual participating UEs to improve wireless communication as described above. Management of access to the set of service entities, in some aspects, may be limited on a case-by-case basis, e.g., as a service-based access and/or subscription. For example, a vehicular UE that is an honest actor with a damaged onboard camera may be determined to be disinforming in relation to the image data or other data derived from the onboard camera sensing data and may have its access to image-based ML services revoked. Based on the determination that the vehicular UE is an honest actor, the vehicular UE may retain access to other service entities associated with other sensors or data sources of the vehicular UE. In some aspects, the loss of access to the image-based ML services may persist as long as the camera is not replaced, e.g., the loss of access may be permanent as far as the particular onboard camera is concerned. The access permission revocation, in some aspects, may be context-based such that a vehicular UE whose feature extraction outputs are being classified as deliberately misleading in particular contexts (e.g., when at busy intersections) but not in other contexts, may have its access to ML services revoked only in the context of busy intersections.

For an honest rogue actor, the errors (e.g., misinformation) may persist for an extended time period (e.g., a 'misinformation period' having a duration of seconds to minutes/hours) but may ultimately be temporary. The perceptive wireless communication system, in accordance with some aspects of the disclosure, may be provided with a method to temporarily exclude and/or discard data from such honest rogue actors during the duration of the misinformation period while accepting/propagating data from the honest actors after the misinformation period is over and the data from the actor is expected to be accurate and/or reliable again. Blocking, revoking the access permissions, inclusion on an access revocation list, or changing the access key for the actor permanently, could lead to (1) disregarding all future information from the actor (including accurate and/or reliable information) and (2) a state in which most, or substantially all, of the actors are blocked such that the network stops receiving data from the actors even after the information becomes accurate and/or reliable. Either of these outcomes may reduce the usefulness of the perceptive wireless communication system. However, constant re-evaluation may increase overhead for the actors and the network.

Accordingly, in some aspects of the disclosure, the reevaluation may be based on sets of criteria that, when satisfied, are likely to be associated with an end of a misinformation period as discussed below.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHz), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL- TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured with a misinformation mitigation component 198 configured to receive, from a network entity associated with a machine learning procedure, a first indication that a first set of data elements transmitted by the wireless device at a first time is categorized as misinformation and that, based on the first set of data elements being categorized as misinformation, the network entity will temporarily exclude data from the wireless device from propagation as input for a subsequent machine learning procedure. The misinformation mitigation component 198 may further be configured to receive a second indication of a set of criteria for requesting a reevaluation of the categorization and transmit, based on meeting one or more criteria in the set of criteria, a second set of data elements to the network entity at a second time. In certain aspects, the base station 102 may be configured with a misinformation mitigation component 199 configured to transmit, for a first wireless device, a first indication that a first set of data elements has been categorized as misinformation and that, based on the first set of data elements being categorized as misinformation, the network entity will temporarily exclude data from the first wireless device from propagation as input for a subsequent machine learning procedure. The misinformation mitigation component 199 may further be configured to transmit, for the first wireless device, a second indication of a first set of criteria for requesting a reevaluation of the categorization by the first wireless device and configure a second set of criteria for performing a reevaluation of the categorization by the network entity. The misinformation mitigation component 199 may further be configured to receive a second set of data elements from the first wireless device at a second time after one or more criteria in the first set of criteria for requesting reevaluation or in the second set of criteria for performing a reevaluation have been met. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu$=0 has a subcarrier spacing of 15 kHz and the numerology µ=4 has a subcarrier spacing of 240 kHz. The symbol length/duration is inversely related to the subcarrier spacing. FIGS. 2A-2D provide an example of normal CP with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
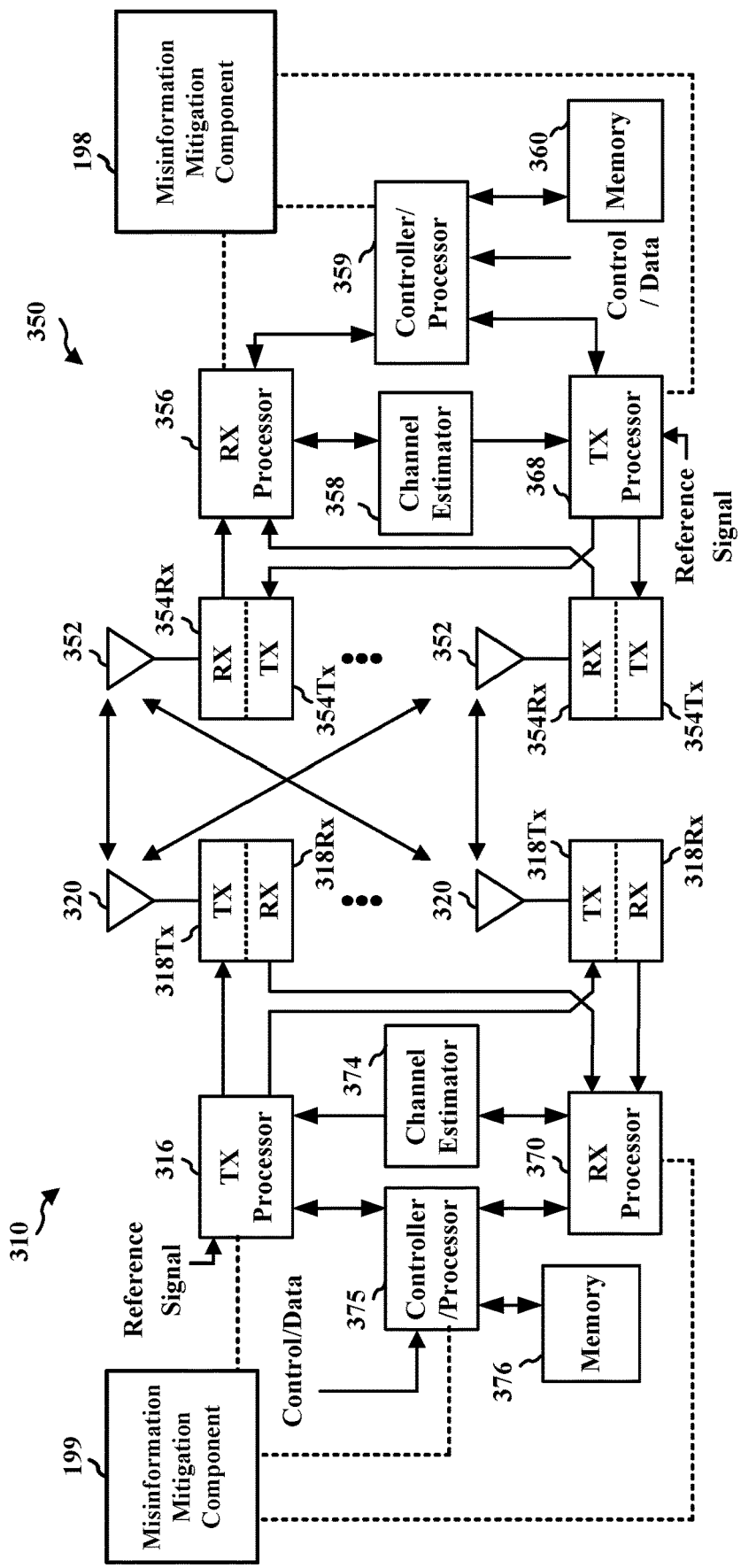
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions, Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the misinformation mitigation component 198 of FIG. 1.

At least one of the TX processor 316, the RX processor 370, and the controller/processor 375 may be configured to perform aspects in connection with the misinformation mitigation component 199 of FIG. 1.

In some aspects of wireless communication, a communication network may include perceptive wireless communication components. Perceptive wireless communication may relate to communication systems that are assisted by the perception of the physical environment/world. The perception of the physical environment/world, in some aspects, includes measurement data and machine learning feature data gathered from vehicular sensors, e.g., RADAR, LIDAR, cameras, GNSS, IMU sensors. Communications tasks that benefit from perception, in some aspects, include beam management, beam blockage prediction, beam refinement, etc.

In some aspects, sensing-related measurement data and feature data gathered from vehicles, may be combined with communications-related measurements and feature data to improve and/or refine the quality and/or efficiency of the communication systems. Perceptive wireless communication, thus, may involve reliable coordination, at multiple stages, between multiple independent agents/actors. In some aspects, the actors may include pedestrian UEs, in-vehicle UEs, vehicles, vehicular sensors, GPS devices, and/or other similar devices providing data for processing by (or propagating through) one or more ML training/inference servers.

For an honest rogue actor, the errors (e.g., misinformation) may persist for an extended time period (e.g., a 'misinformation period' having a duration of seconds to minutes) but may ultimately be temporary. The perceptive wireless communication system, in accordance with some aspects of the disclosure, may be provided with a method to temporarily exclude and/or discard data from such honest rogue actors during the duration of the misinformation period while accepting/propagating data from the honest actors after the misinformation period is over and the data from the actor is expected to be accurate and/or reliable again. The method may avoid permanently blacklisting, revoking the access permissions, or changing the access key for the actor for long periods of time or permanently, which could lead to (1) disregarding all future information from the actor (including accurate and/or reliable information) and (2) a state in which most, or substantially all, of the actors are blacklisted such that the network stops receiving data from the actors even after the information becomes accurate and/or reliable. Either of these outcomes may reduce the usefulness of the perceptive wireless communication system. However, constant reevaluation may increase overhead for the actors and the network. Accordingly, in some aspects of the disclosure, the reevaluation may be based on sets of criteria that, when satisfied, are likely to be associated with an end of a misinformation period as discussed below.

Figure 4:
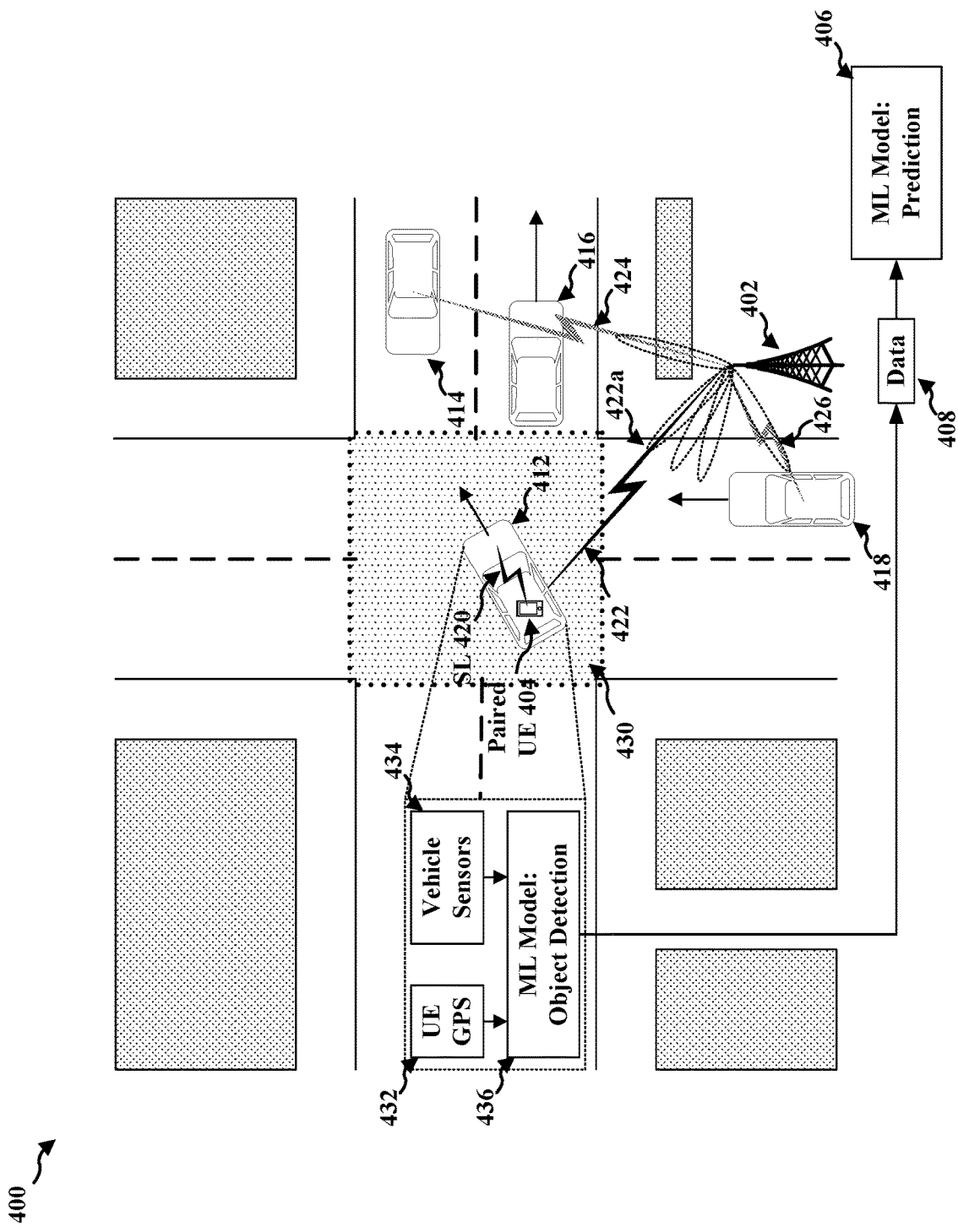
FIG. 4 is a diagram illustrating an example of a UE positioning based on reference signal measurements.

FIG. 4 is a diagram 400 illustrating an environment in which a perceptive wireless communication system may identify a misinforming rogue actor in accordance with some aspects of the disclosure. In diagram 400, a UE 404 may be paired with a vehicle 412 via a communication link 420 (e.g., a sidelink). The UE 404 may be in communication with a base station 402 via a communication link 422 (using a first beam 422a from the base station 402). The area 430 including vehicle 412, in some aspects, may be associated with high-mean, high-variance errors of GPS measurements such that the GPS information may be categorized as misinformation (e.g., having a high probability of being inaccurate and/or unreliable). As illustrated in diagram 400, the vehicle may also be engaged in a left turn into another lane which, in some aspects, may be known to lead to unreliable GNSS sensor measurements.

The vehicle 412 may include a set of sensors 434 as described above and the UE 404 paired with the vehicle 412 may be associated with a UE GPS 432. The set of sensors 434 and the UE GPS 432 may be associated with a ML model 436 for object detection. The ML model 436 may be operated by one of the vehicle 412 and/or the UE 404 based on data captured by the device operating the ML model 436 and data received from the paired device not operating the ML model 436.

The ML model 436 may be used to determine characteristics of one or more of the vehicle 412, the UE 404, a vehicle 414, a vehicle 416, and/or a vehicle 418. The characteristics, in some aspects, may include one or more of a location, a velocity, a bounding box, or other relevant characteristics. The output of the ML model 436, in some aspects, may then be provided as data 408 (e.g., a set of one or more data elements) to a network entity associated with ML model 406 for an analysis associated with the perceptive wireless communication. The data 408 may be provided to the network entity via the communication link 422 between the UE and the base station 402.

In some aspects, based on categorizing the vehicle 412 and/or UE 404 as providing misinformation (e.g., being a rogue actor), the network may initiate communication with one or more of vehicle 414 and/or 418. For example, the base station 402 may initiate communication link 424 with vehicle 414 and/or communication link 426 with vehicle 418 to provide (accurate and/or reliable) data for perceptive wireless communication.

Figure 5:
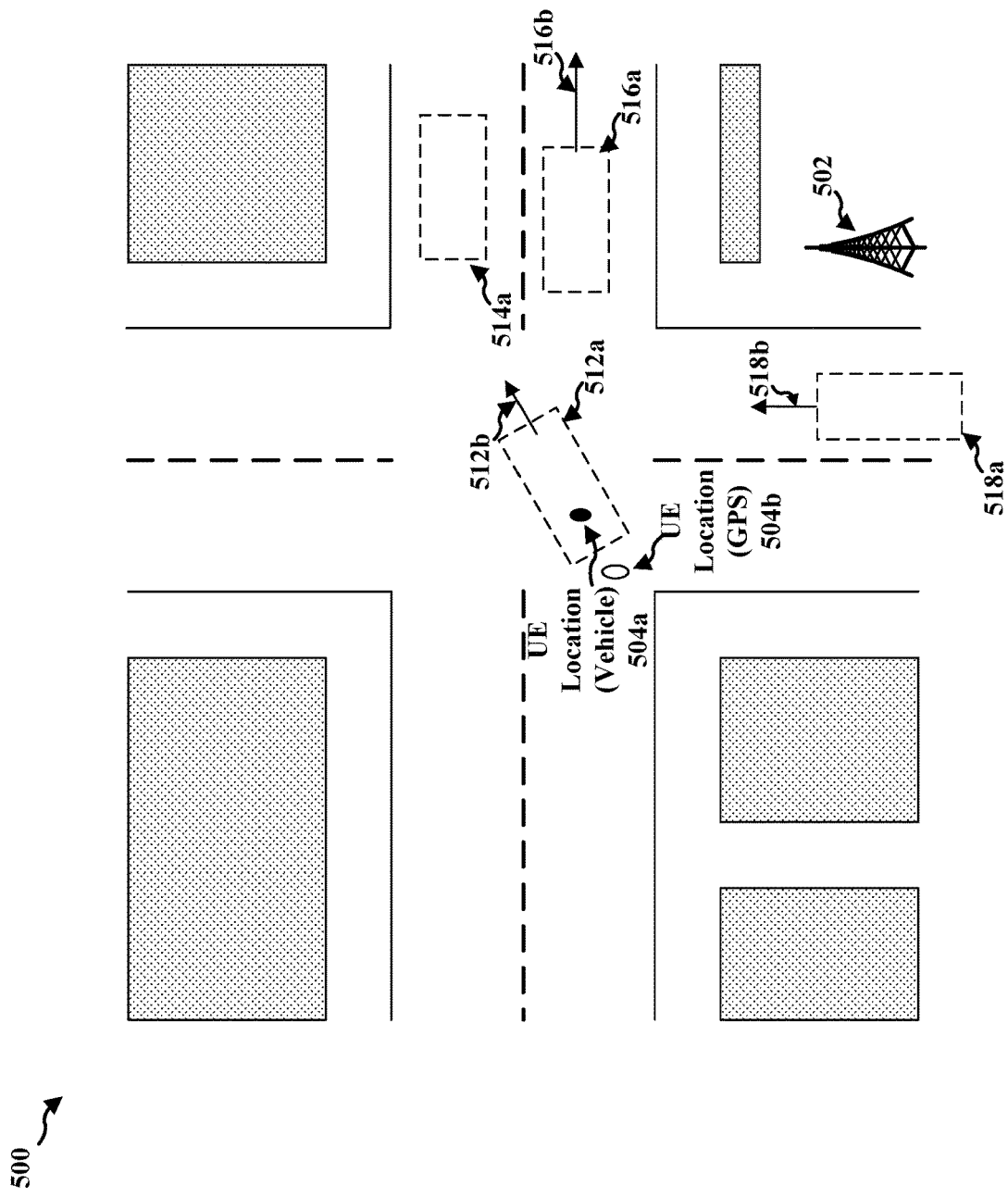
FIG. 5 is a diagram illustrating different data that may be associated with, and/or determined by, the ML model of FIG. 4 in accordance with some aspects of the disclosure.

FIG. 5 is a diagram 500 illustrating different data that may be associated with, and/or determined by, the ML model 436 of FIG. 4 in accordance with some aspects of the disclosure. A bounding box 512a, a bounding box 514a, a bounding box 516a, and a bounding box 518a associated with vehicles 412, 414, 416, and 418 of FIG. 4, respectively, may be determined by the ML model 436. Additionally, a velocity 512b, a velocity 516b, and a velocity 518b may be determined for each of the vehicles 412, 416, and 418 of FIG. 4, respectively. The vehicle 412 may determine a location 504a of the UE 404 may be determined while the UE (e.g., by UE GPS 432) may determine a location 504b of the UE 404.

The different data elements, e.g., bounding boxes 512a-518a, velocities 512b-518b, and/or locations 504a and 504b may be inaccurate and/or unreliable. The unreliability or inaccuracy may be based on the location of the vehicle 412 and/or the UE 404 or the operation of the vehicle 412 and/or the UE 404. For example, the vehicle 412 and the UE 404 may be in an area associated with high-mean, high-variance errors of GPS measurements or may be involved in an operation (e.g., a left turn) that may be associated with inaccuracy and/or unreliability based on rapidly changing characteristics (e.g., location, velocity, orientation, etc.).

Figure 6:
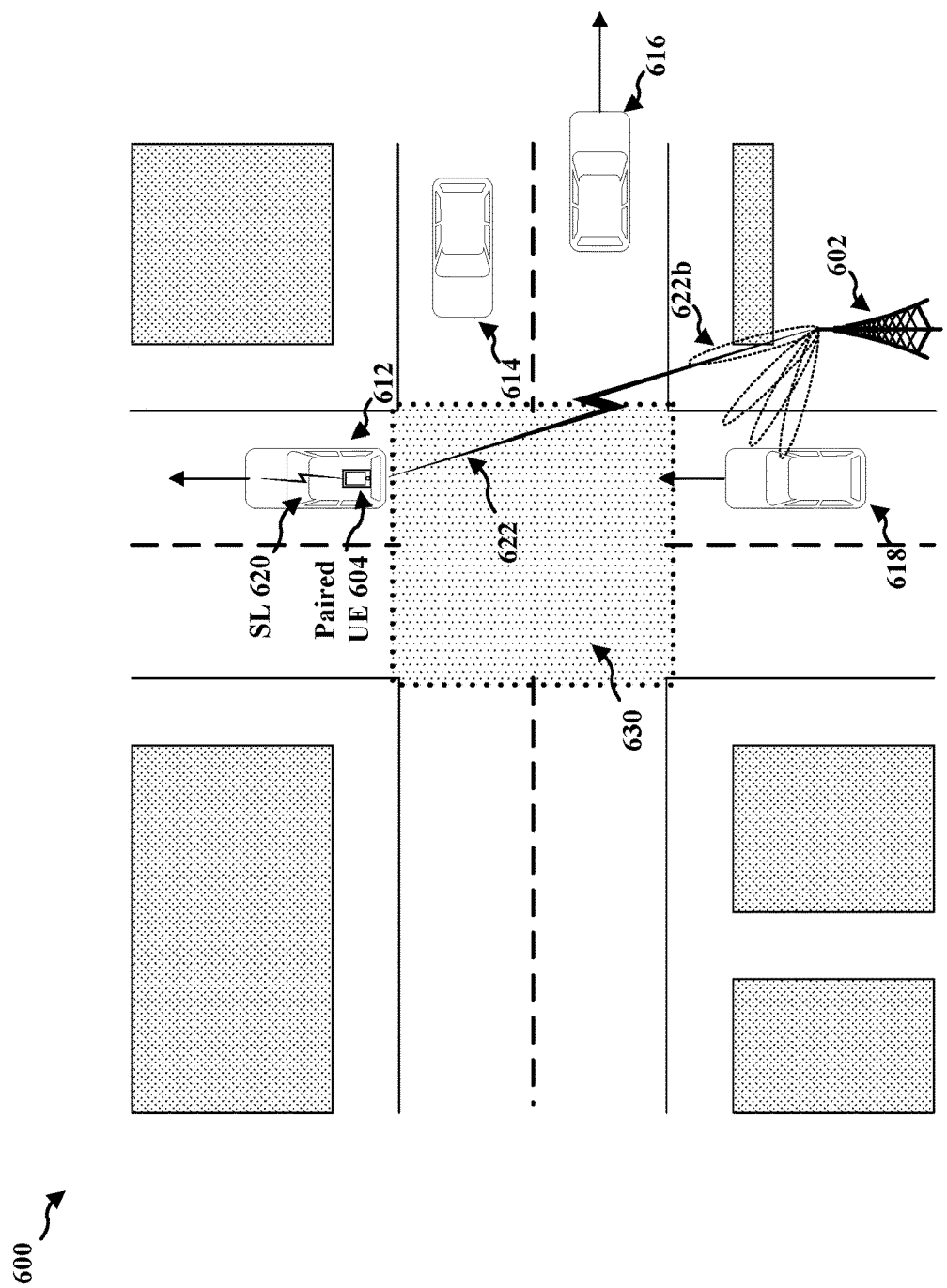
FIG. 6 is a diagram illustrating the environment illustrated in FIG. 4 at a subsequent instant in time in accordance with some aspects of the disclosure.

FIG. 6 is a diagram 600 illustrating the environment illustrated in diagram 400 of FIG. 4 at a subsequent instant in time in accordance with some aspects of the disclosure. At the instant in time illustrated in diagram 600, the vehicle 612 and/or UE 604 (corresponding to vehicle 412 and/or UE 404, respectively) may have completed the operation (e.g., the left turn) associated with inaccuracy and/or unreliability and/or left the area associated with high-mean, high-variance errors of GPS measurements. For example, the vehicle 612 and the paired UE 604 (via SL 620) may leave an area 630 associated with the high-mean, high-variance errors of GPS measurements or may have completed the turn and begun traveling in a straight line. Once the data from the vehicle 612 and/or the UE 604 regarding the environment (e.g., data related to itself/themselves, vehicle 614, vehicle 616, and/or vehicle 618) is expected to be accurate and/or reliable, the perceptive wireless communication may reevaluate the vehicle 612, the UE 604, and/or a data element received from one of the vehicle 612 or the UE 604. Vehicle 612 and or the UE 604 may communicate via base station 602 via a connection 622 (via beam 622b). The expectation of accuracy and/or reliability may be based on a set of criteria communicated to the vehicle 612 and/or UE 604 or configured by the network as discussed below in relation to FIGS. 7-12.

Figure 7:
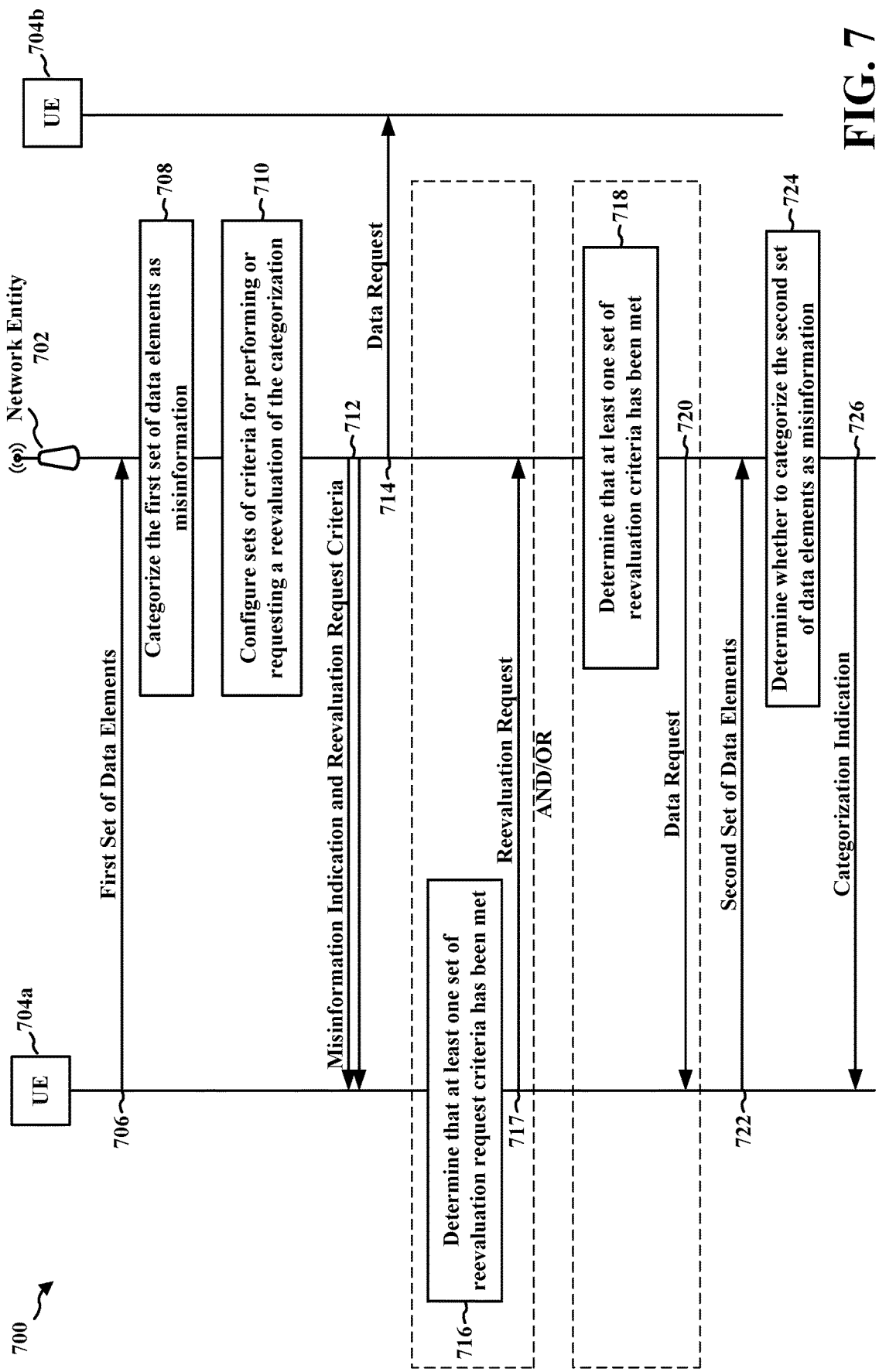
FIG. 7 is a call flow diagram illustrating a method of perceptive wireless communication utilizing a network entity, a first UE (e.g., a vehicle or other wireless device), and a second UE in accordance with some aspects of the disclosure.

FIG. 7 is a call flow diagram 700 illustrating a method of perceptive wireless communication utilizing a network entity 702, a first UE 704a (e.g., a vehicle or other wireless device), and a second UE 704b in accordance with some aspects of the disclosure. The first UE 704a may transmit a first set of data elements 706 to the network entity 702 based on data captured or measured by one or more sensors. The first set of data elements 706 may include information relating to one or more of raw sensing data, bounding boxes, and other features extracted from onboard ML models, UE/wireless device location, UE/wireless device orientation/velocity, and/or beam measurements at the UE. The network entity 702 may categorize, at 708, the first set of data elements 706 as misinformation. Categorizing, at 708, the first set of data elements 706 as misinformation, in some aspects, may include adding the first UE 704a, or a component of the first UE 704a, to a blacklist including a list of actors or components from which data will be ignored and/or discarded (e.g., data that will not be propagated through a ML model associated with perceptive wireless communication).

The categorization at 708 may be based on a ML model (e.g., a GAN or VAE) maintained by the network entity. In some aspects, the categorization may be made with respect to a particular component of the first set of data elements 706, such as a GPS or GNSS measurement being categorized as misinformation based on the GPS and/or GNSS measurements from the area associated with the first UE 704a being known to the network entity to be associated with high-mean and/or high-variance errors. Similarly, a first set of data elements 706 related to a velocity of the first UE 704a may be identified as misinformation based on previous velocity data changing at a rate that is above a threshold rate (e.g., during a turn or other maneuver that reduces the usefulness of the first set of data elements 706 for making predictions). In some aspects, a basis for the categorization as misinformation may be identified during the categorization at 708. The categorization, in some aspects, may be applied to the first UE 704a as a whole instead of being applied to individual types of data or components of a first set of data elements 706.

Based on the categorization at 708, the network entity 702 may configure, at 710, sets of criteria for requesting reevaluation from the first UE 704a and/or sets of criteria for performing a reevaluation by the network entity 702. The network entity may then transmit a set of indications 712. The set of indications 712 may include a first indication that the first set of data elements 706 has been categorized, at 708, as misinformation. The first indication may indicate to the first UE 704a that, based on the categorization of the first set of data elements 706 as misinformation, the network entity 702 will temporarily exclude data from the first wireless device from propagation as input for subsequent analysis (e.g., via one or more of a machine learning (ML) based algorithm, a non-ML based algorithm, and/or a service) at the network entity 702. The set of indication 712 may further include a second indication of sets of criteria for requesting a reevaluation of the categorization by the first UE 704a.

The sets of criteria for requesting reevaluation may relate to one or more of a locally-evaluated confidence (e.g., a threshold confidence value), a field of view, a location, a velocity, an acceleration, an elapsed time since categorization as misinformation (e.g., a minimum expected time for conditions to change), and/or a basis of the categorization of the first set of data elements 706 as misinformation. For example, referring to FIGS. 4 and 6, a vehicle 412/612 making a left turn as illustrated in FIG. 4 may produce misinformation with respect to its location due to poor GNSS operation based on a rapidly changing velocity and/or acceleration associated with the left turn and may be provided with one or more criteria in the set of criteria relating to completing the turn and beginning to travel in a straight line associated with a velocity and/or acceleration that is below a threshold value as illustrated in FIG. 6. Alternatively, or additionally, GPS data from the vehicle 412 and/or the UE 404 may be categorized as misinformation based on being in area 430 and the vehicle 412 and/or the UE 404 may be provided with one or more criteria in the set of criteria relating to leaving the area 430/630. Additional sets of criteria for requesting a reevaluation may be used in accordance with the principles guiding the example sets of criteria above in some aspects.

The sets of criteria for performing a reevaluation may relate to one or more of receiving a request from a different actor, information from a co-located, or paired, actor (e.g., UE 404 paired/co-located with vehicle 412), an elapsed time since categorization as misinformation (e.g., a minimum expected time for conditions to change), and/or a basis of the categorization of the first set of data elements 706 as misinformation. For example, the sets of criteria for performing a reevaluation may include at least one set of criteria relating to receiving a request from a different actor for a pairing and/or association with the rogue actor. Additionally, or alternatively, the sets of criteria for performing a reevaluation may include a time period after which to perform a reevaluation. The time period, in some aspects, may be based on the reason for categorizing the actor as a rogue actor (e.g., categorizing the first set of data elements 706 as misinformation). In some aspects, the sets of criteria for performing a reevaluation may include a set of criteria based on detecting or identifying that a reason for the categorization of the first set of data elements 706 as misinformation has been remedied or is no longer present. The sets of criteria for performing a reevaluation, in some aspects, may include a set of criteria based on a co-located second actor indicating a change in the configuration or state of the actor associated with the first set of data elements 706. Additional sets of criteria for performing a reevaluation may be used in accordance with the principles guiding the example sets of criteria above in some aspects.

Based on categorizing, at 708, the first set of data elements 706 as misinformation (or the first UE 704a as a rogue actor), the network entity 702 may transmit a request for data 714 to at least a second UE 704b and, in some aspects, to additional UEs not shown). The request for data 714 may be for specific data corresponding to the first set of data elements 706 (or a component of the first set of data elements 706) that was categorized, at 708, as misinformation.

Sometime after transmitting the set of indications 712, the first UE 704a may determine, at 716, that at least one set of criteria for requesting a reevaluation has been met. For example, the first UE 704a may determine that at least one of (1) a configured time has elapsed since the set of indications 712 was received, (2) an operation causing the categorization as misinformation has ended (e.g., the first UE 704a is no longer turning, is no longer accelerating, is no longer occluded by a passing object, etc.), (3) a state causing the categorization as misinformation has changed (e.g., the first UE 704a has left a particular area associated with high-mean and/or high-variance errors in GPS and/or GNSS measurements), or (4) another set of criteria in the sets of criteria for requesting a reevaluation has been met. For example, referring to FIGS. 4 and 6, a vehicle 412 (or 612) may move from inside the area 430 to outside the corresponding area 630 and determine that a set of criteria relating to moving out of the area 430/630 has been met. Similarly, the vehicle 412 (or 612) may complete a left turn and determine that a set of criteria relating to completing the left turn (e.g., an acceleration or rate of change of orientation is below a threshold) has been met.

In some aspects, the first UE 704a may refrain from sending additional sets of data elements for at least one subsequent analysis by the network entity (or service associated with the network entity) until the at least one set of criteria for requesting a reevaluation has been met. Upon determining, at 716, that at least one set of criteria for requesting a reevaluation has been met, the first UE 704a, in some aspects, may transmit, and network entity 702 may receive, a reevaluation request 717 indicating to the network entity 702 that the at least one set of criteria for requesting a reevaluation had been met.

The network entity 702 may, at 718, determine that one or more criteria in the set of criteria for performing a reevaluation has been met in some aspects. For example, the network entity 702 may determine that at least one of (1) a configured time has elapsed since the set of indications 712 was transmitted, (2) a request from a different actor for a pairing and/or association with the rogue actor. (3) a state causing the categorization as misinformation has changed (e.g., the first UE 704a has left a particular area associated with high-mean, high-variance errors in GPS and/or GNSS measurements), or (4) another set of criteria in the sets of criteria for performing a reevaluation has been met. In some aspects, the network entity 702 may determine that the one or more criteria in the set of criteria for performing a reevaluation based on receiving the reevaluation request 717. Based on determining, at 718, that the one or more criteria in the set of criteria for performing a reevaluation has been met, the network entity 702 may transmit, and the first UE 704*a* may receive, a data request 720 to the first UE 704*a*.

Based on determining, at 716, that the one or more criteria in the set of criteria for requesting a reevaluation has been met and/or based on receiving the data request 720, the first UE 704*a* may transmit, and the network entity 702 may receive, a second set of data elements 722. In some aspects, the transmission of the second set of data elements 722 may be in place of an explicit request for reevaluation (e.g., reevaluation request 717). The network entity may determine, at 724, whether to categorize the second set of data elements as misinformation. Based on the determination at 724, the network entity 702 may transmit (or refrain from transmitting) a categorization indication 726. The categorization indication 726, may include a third indication that the second set of data elements is categorized as not being misinformation or a fourth indication that the second set of data elements is categorized as misinformation. The fourth indication may be associated with an indication of new sets of criteria based on the categorization at 724.

If the categorization indication 726 includes an indication that the second set of data elements is categorized as misinformation, the network entity 702 may configure second sets of criteria for performing or requesting a reevaluation and transmit the second sets of criteria for performing or requesting a reevaluation to the first UE 704*a*. The network entity 702 may further receive a third data element based on one or more of a determination by the first UE 704*a* that one or more criteria in the second set of criteria for requesting a reevaluation has been met or a determination by the network entity 702 that one or more criteria in the second set of criteria for performing a reevaluation has been met and a transmission of a data request to the first UE 704*a*. If the categorization indication 726 includes an indication that the second set of data elements is categorized as not being misinformation, the process may continue with the transmission of additional data elements from the first UE 704*a* to the network entity 702 for propagation through a ML model for perceptive wireless communication. Additionally, in some aspects, the network entity may remove the first UE 704*a*, or the component of the first UE 704*a* associated with the first set of data elements 706, from a blacklist including rogue actors (e.g., actors associated with data elements categorized as misinformation).

Figure 8:
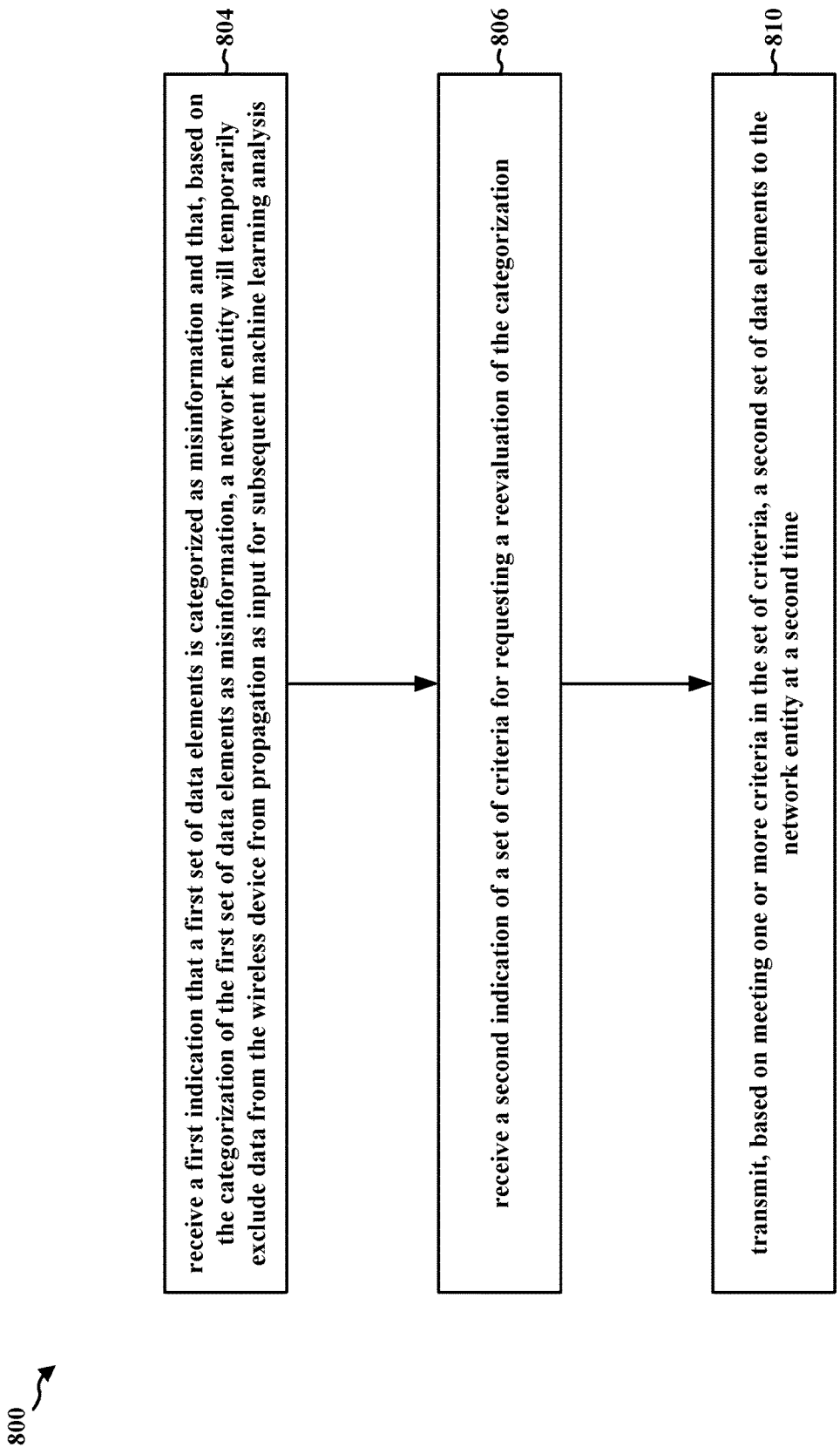
FIG. 8 is a flowchart of a method of wireless communication.

FIG. 8 is a flowchart 800 of a method of wireless communication. The method may be performed by a wireless device (e.g., the UE 104, 404, 604, or 704*a*; the vehicle 412 or 612; the apparatus 1304). At 804, the wireless device may receive an indication that a first set of data elements transmitted by the wireless device at a first time is categorized as misinformation. For example, 804 may be performed by application processor 1306, cellular baseband processor 1324, transceiver(s) 1322, antenna(s) 1380, or misinformation mitigation component 198 of FIG. 13. The first indication, in some aspects, may be received from a network entity associated with a machine learning analysis. The first indication may indicate, in some aspects, that the network entity will temporarily exclude data from the wireless device from propagation as input for subsequent machine learning (or other) analysis based on the categorization of a first set of data elements as misinformation.

The wireless device may have previously transmitted the first set of data elements for processing at a network entity associated with a machine learning analysis. In some aspects, the first set of data elements includes one or more of feature sets or raw data information received from a set of sensors associated with the wireless device. The first set of data elements, in some aspects, may include one or more of an object bounding box associated with at least the wireless device, a location associated with the wireless device, pose (orientation) information associated with the wireless device, heading information associated with the wireless device, or a gradient update for a federated learning neural network, e.g., an update generated for backpropagation through an ML architecture using the local data by the vUE (as described generally in relation to FIG. 16). For example, referring to FIGS. 4-7, a first UE 704*a*, such as a vehicle 412/612 and/or an associated UE 404/604, may transmit data relating to the bounding boxes 512*a*-518*a*, the velocities 512*b*-518*b*, and or the locations 504*a* and/or 504*b* to a base station 402/502/602 (corresponding to network entity 702).

In some aspects, the first set of data elements may be based on information received from a set of one or more sensors associated with the wireless device. For example, data from the set of one or more sensors may be processed by a local ML model to derive the first set of data elements. The set of one or more sensors, in some aspects, may be associated with a vehicle that is associated with the wireless device and the set of one or more sensors includes one or more of a RADAR sensor, a LIDAR sensor, image capture sensors, a GNSS, a GPS, or an IMU sensor. In some aspects, the wireless device may be the vehicle and the set of one or more sensors includes sensors associated with a paired and/or associated UE such as a GPS or IMU sensor. In some aspects, the first set of data elements may include one or more of object bounding boxes derived from raw data from the set of sensors associated with the wireless device, wireless channel information associated with the wireless device, global positioning information, a speed associated with the wireless device, an acceleration associated with the wireless device, pose information (e.g., roll, pitch, and yaw with respect to a global and/or reference coordinate system or another reference coordinate system) associated with the wireless device, heading information (e.g., a velocity vector in a set of principal directions of a coordinate system) associated with the wireless device, or a gradient update for a federated learning neural network. For example, referring to FIG. 4, the wireless device may be one of UE 404 or vehicle 412 associated with the UE GPS 432 or vehicle sensors 434, respectively, and may each be associated with the ML model 436.

In some aspects, the first indication may include a second indication that the wireless device is categorized as a misinformation source. The first indication that the first set of data elements is categorized as misinformation, in some aspects, indicates for the wireless device to not transmit additional data elements unless at least one of a request for a second set of data elements is received or a set of criteria in sets of criteria for requesting reevaluation is met. For example, referring to FIG. 7, the first UE 704*a* may receive, and network entity may transmit, the set of indications 712 including the first indication that the first set of data elements 706 has been categorized, at 708, as misinformation. The set of indication 712 may further indicate for the first UE 704*a* to not transmit additional data until one of (1) a set of criteria in sets of criteria for requesting reevaluation has been determined at 716 to have been met or (2) a data request 720 has been received.

At 806, the wireless device may receive a second indication of sets of criteria for requesting a reevaluation of the categorization. For example, 806 may be performed by application processor 1306, cellular baseband processor 1324, transceiver(s) 1322, antenna(s) 1380, or misinformation mitigation component 198 of FIG. 13. The sets of criteria, in some aspects, may relate to one or more of a measure of confidence of the wireless device in determining the first set of data elements; a change in the measure of a confidence of the wireless device in determining the first set of data elements; a change to one or more of a field of view associated with sensors associated with the wireless device; a location associated with the wireless device; a velocity associated with the wireless device; an acceleration associated with the wireless device; an elapsed time since receiving the second indication of the set of criteria; or a correction of a known cause for the first set of data elements being categorized as misinformation. Additional sets of criteria for requesting a reevaluation may be used in accordance with the principles guiding the example sets of criteria above in some aspects. For example, referring to FIG. 7, the first UE 704a may receive, and the network entity 702 may transmit, the set of indications 712 including the first indication that the first set of data elements 706 has been categorized, at 708, as misinformation.

Finally, at 810, the wireless device may transmit a second set of data elements to the network entity at a second time based on meeting one or more criteria in the set of criteria. For example, 810 may be performed by application processor 1306, cellular baseband processor 1324, transceiver(s) 1322, antenna(s) 1380, or misinformation mitigation component 198 of FIG. 13. The second set of data elements, in some aspects, may include similar information as included in the first set of data elements. The second set of data elements may then be evaluated by the network entity to be categorized as either misinformation or accurate and/or reliable information (e.g., non-misinformation). For example, referring to FIG. 7, the first UE 704a may transmit, and network entity 702 may receive, second set of data elements 722 based on a determination, at 716, that one or more criteria in the set of criteria for requesting reevaluation has been met and/or based on receiving the data request 720.

In some aspects, transmitting, at 810, the second set of data elements based on meeting the one or more criteria in the set of criteria may include determining whether one or more criteria in the set of criteria for requesting reevaluation has been met and/or whether a request for a second set of data elements has been received. For example, referring to FIGS. 4-7, the first UE 704a (representing one of UE 404/604 or vehicle 412/612) may determine, at 716, that at least one set of criteria for requesting a reevaluation has been met. The first UE 704a may determine, e.g., that at least one of (1) a configured time has elapsed since the set of indications 712 was received, (2) an operation causing the categorization as misinformation has ended (e.g., the first UE 704a is no longer turning, is no longer accelerating, is no longer occluded by a passing object, etc.), (3) a state causing the categorization as misinformation has changed (e.g., the first UE 704a has left area 430/630 associated with high-mean and/or high-variance errors in GPS and/or GNSS measurements), or (4) another set of criteria in the sets of criteria for requesting a reevaluation has been met. Additionally, or alternatively, the wireless device may receive, and the network entity may transmit, a data request 720.

Figure 9:
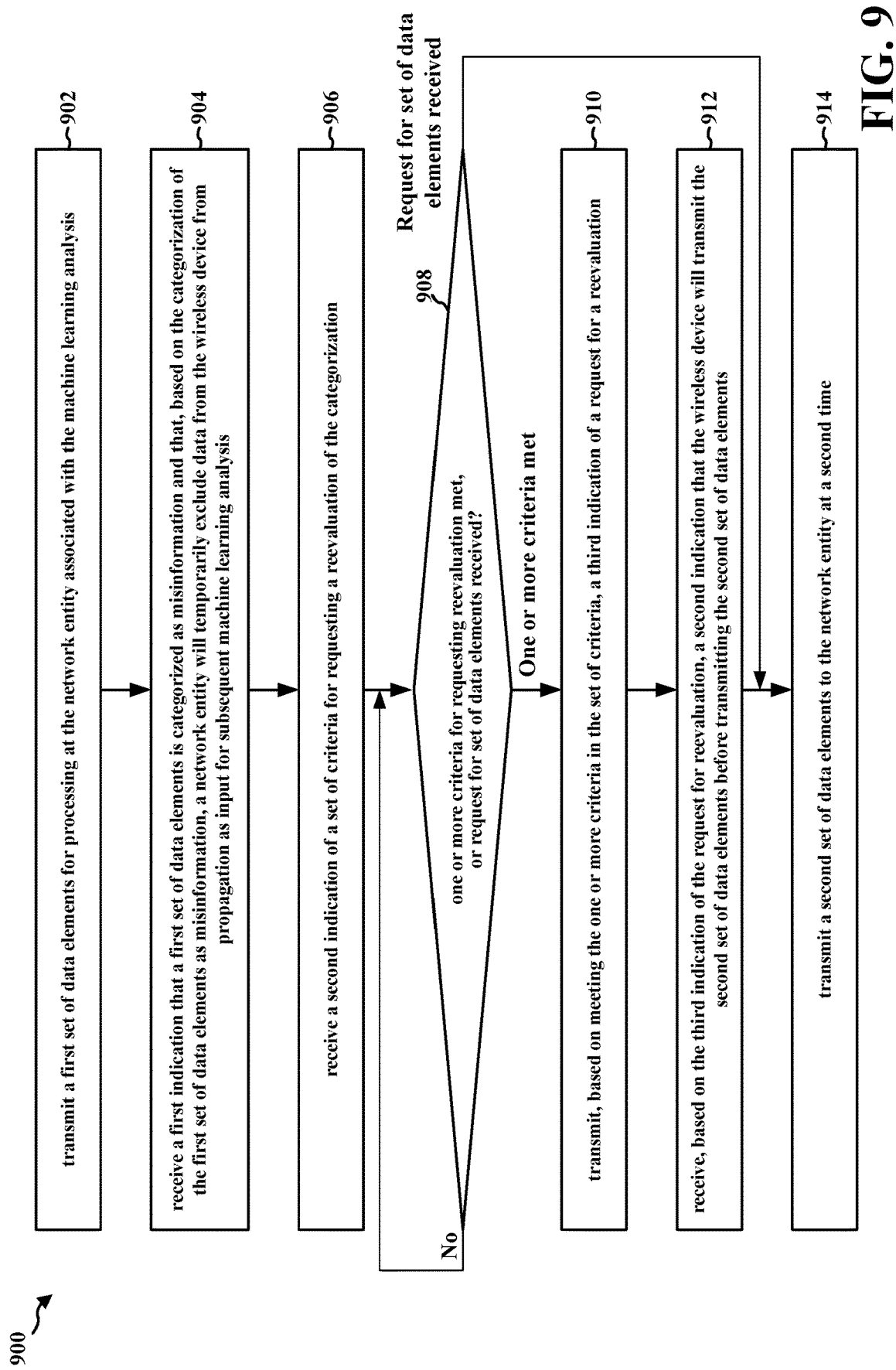
FIG. 9 is a flowchart of a method of wireless communication.

FIG. 9 is a flowchart 900 of a method of wireless communication. The method may be performed by a wireless device (e.g., the UE 104, 404, 604, or 704a; the vehicle 412 or 612; the apparatus 1304). At 902, the wireless device may transmit a first set of data elements for processing at a network entity associated with a machine learning analysis. For example, 902 may be performed by application processor 1306, cellular baseband processor 1324, transceiver(s) 1322, antenna(s) 1380, or misinformation mitigation component 198 of FIG. 13. The first set of data elements, in some aspects, may include one or more of an object bounding box associated with at least the wireless device, a location associated with the wireless device, pose (orientation) information associated with the wireless device, heading information associated with the wireless device, or a gradient update for a federated learning neural network. For example, referring to FIGS. 4-7, a vehicle 412/612 and/or an associated UE 404/604 (corresponding to the first UE 704a) may transmit data relating to the bounding boxes 512a-518a, the velocities 512b-518b, and or the locations 504a and/or 504b to a base station 402/502/602 (corresponding to network entity 702).

In some aspects, the first set of data elements may be based on information received from a set of one or more sensors associated with the wireless device. For example, data from the set of one or more sensors may be processed by a local ML model to derive the first set of data elements. The set of one or more sensors, in some aspects, may be associated with a vehicle that is associated with the wireless device and the set of one or more sensors includes one or more of a RADAR sensor, a LIDAR sensor, image capture sensors, a GNSS, a GPS, or an IMU sensor. In some aspects, the wireless device may be the vehicle and the set of one or more sensors includes sensors associated with a paired and/or associated UE such as a GPS or IMU sensor. For example, referring to FIG. 4, the wireless device may be one of UE 404 or vehicle 412 associated with the UE GPS 432 or vehicle sensors 434, respectively, and may each be associated with the ML model 436.

At 904, the wireless device may receive an indication that a first set of data elements transmitted by the wireless device at a first time is categorized as misinformation. For example, 904 may be performed by application processor 1306, cellular baseband processor 1324, transceiver(s) 1322, antenna(s) 1380, or misinformation mitigation component 198 of FIG. 13. The first indication, in some aspects, may be received from a network entity associated with a machine learning analysis. The first indication may indicate, in some aspects, that the network entity will temporarily exclude data from the wireless device from propagation as input for subsequent machine learning (or other) analysis based on the categorization of the first set of data elements as misinformation.

In some aspects, the first indication may include a second indication that the wireless device is categorized as a misinformation source. The first indication that the first set of data elements is categorized as misinformation, in some aspects, indicates for the wireless device to not transmit additional data elements unless at least one of a request for a second set of data elements is received or a set of criteria in sets of criteria for requesting reevaluation is met. For example, referring to FIG. 7, the first UE 704a may receive, and network entity 702 may transmit, the set of indications 712 including the first indication that the first set of data elements 706 has been categorized, at 708, as misinformation. The set of indication 712 may further indicate for the first UE 704a to not transmit additional data until one of (1)

a set of criteria in sets of criteria for requesting reevaluation has been determined at 716 to have been met or (2) a data request 720 has been received.

At 906, the wireless device may receive a second indication of sets of criteria for requesting a reevaluation of the categorization. For example, 906 may be performed by application processor 1306, cellular baseband processor 1324, transceiver(s) 1322, antenna(s) 1380, or misinformation mitigation component 198 of FIG. 13. The sets of criteria, in some aspects, may relate to one or more of a confidence of the wireless device in determining the first set of data elements; a change to one or more of a field of view associated with the wireless device, a location associated with the wireless device, a velocity associated with the wireless device, or an acceleration associated with the wireless device; an elapsed time since receiving the indication of the sets of criteria; or a correction of an identified cause for the first set of data elements being categorized as misinformation. Additional sets of criteria for requesting a reevaluation may be used in accordance with the principles guiding the example sets of criteria above in some aspects. For example, referring to FIG. 7, the first UE 704*a* may receive, and the network entity 702 may transmit, the set of indications 712 including the second indication of sets of criteria for requesting a reevaluation of the categorization.

In some aspects, at 908, the wireless device may determine whether one or more criteria in the set of criteria for requesting reevaluation has been met and/or whether a request for a second set of data elements has been received. For example, 908 may be performed by application processor 1306, cellular baseband processor 1324, or misinformation mitigation component 198 of FIG. 13. For example, referring to FIGS. 4-7, the first UE 704*a* (representing one of UE 404/604 or vehicle 412/612) may determine, at 716, that at least one set of criteria for requesting a reevaluation has been met. The first UE 704*a* may determine, e.g., that at least one of (1) a configured time has elapsed since the set of indications 712 was received, (2) an operation causing the categorization as misinformation has ended (e.g., the first UE 704*a* is no longer turning, is no longer accelerating, is no longer occluded by a passing object, etc.), (3) a state causing the categorization as misinformation has changed (e.g., the first UE 704*a* has left area 430/630 associated with high-mean and/or high-variance errors in GPS and/or GNSS measurements), or (4) another set of criteria in the sets of criteria for requesting a reevaluation has been met. Additionally, or alternatively, the wireless device may receive, and the network entity may transmit, a data request 720.

If the wireless device determines, at 908, that one or more criteria in the set of criteria for requesting reevaluation has not been met and that a request for a second set of data elements has not been received, the wireless device may perform a subsequent determination at 908. The determination at 908, in some aspects, may be part of a monitoring operation based on the criteria in the sets of criteria for requesting a reevaluation. In some aspects, the determinations at 908 may be performed periodically or based on one or more triggering events.

If the wireless device determines, at 908, that a request for a second set of data elements has been received, the wireless device may transmit, at 914, a second set of data elements to the network entity at a second time based on the determination at 908. For example, 914 may be performed by application processor 1306, cellular baseband processor 1324, transceiver(s) 1322, antenna(s) 1380, or misinformation mitigation component 198 of FIG. 13. The second set of data elements, in some aspects, may include similar information as included in the first set of data elements. The second set of data elements may then be evaluated by the network entity to be categorized as either misinformation or accurate and/or reliable information (e.g., non-misinformation). For example, referring to FIG. 7, the first UE 704*a* may transmit, and network entity 702 may receive, second set of data elements 722 based on a determination, at 716, that one or more criteria in the set of criteria for requesting reevaluation has been met and/or based on receiving the data request 720.

If the wireless device determines, at 908, that one or more criteria in the set of criteria for requesting reevaluation has been met, at 910, the wireless device may transmit, based on meeting the one or more criteria in the set of criteria, a third indication of a request for a reevaluation and, at 912, may receive, based on the third indication of the request for reevaluation, a second indication that the wireless device will transmit the second set of data elements before transmitting the second set of data elements at 914. For example, 910 and 912 may be performed by application processor 1306, cellular baseband processor 1324, transceiver(s) 1322, antenna(s) 1380, or misinformation mitigation component 198 of FIG. 13.

Figure 10:
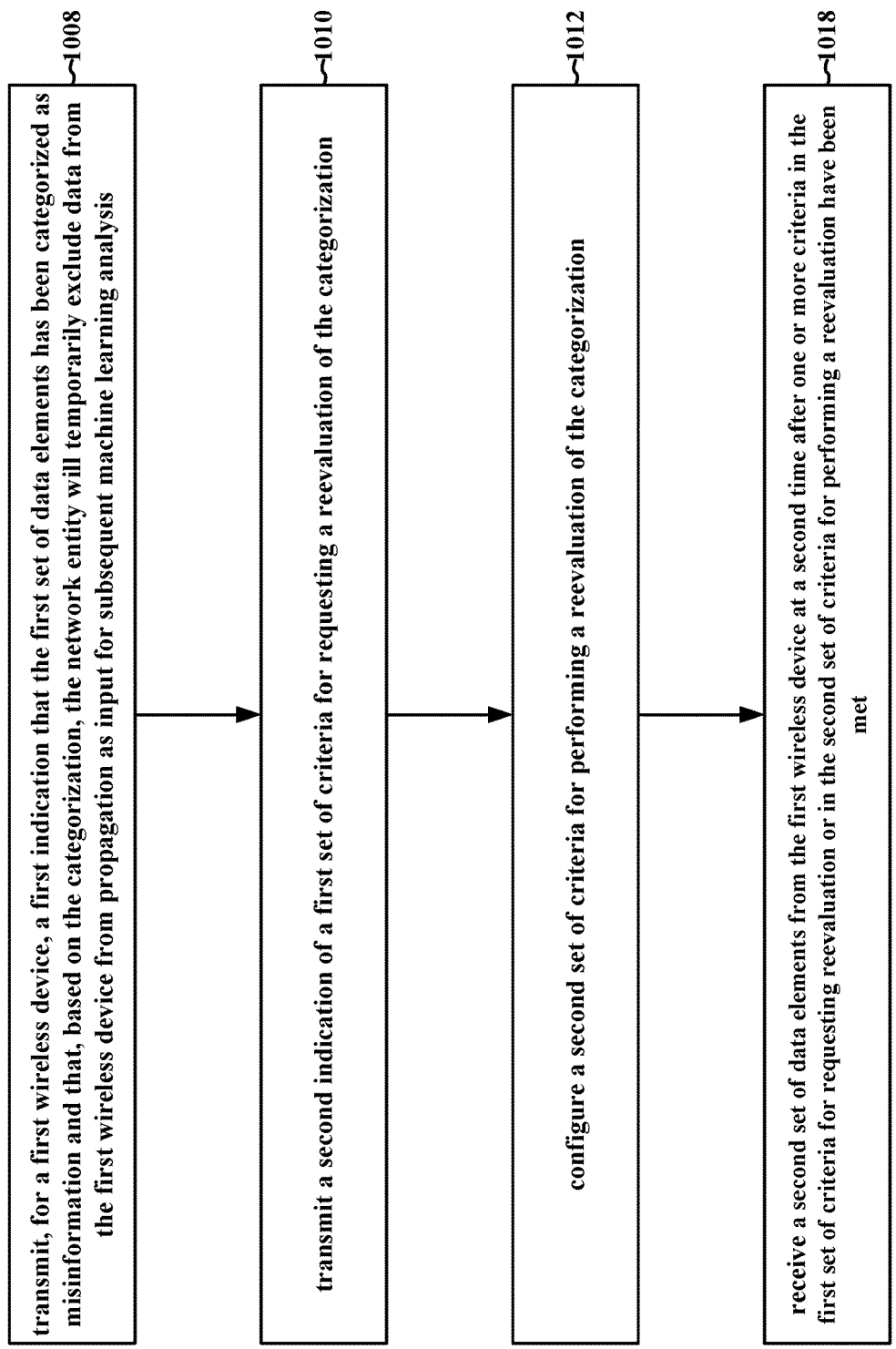
FIG. 10 is a flowchart of a method of wireless communication.

FIG. 10 is a flowchart 1000 of a method of wireless communication. The method may be performed by a network device (e.g., the base station 102, 402, 502, or 602; the network entity 702, 1402, or 1560). At 1008, the network device may transmit, to a first wireless device, an indication that a first set of data elements transmitted by the wireless device at a first time is categorized as misinformation. For example, 1008 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. The first indication may indicate, in some aspects, that the network device will temporarily exclude data from the wireless device from propagation as input for subsequent machine learning analysis based on the categorization of the first set of data elements as misinformation.

In some aspects, the first indication may include a third indication that the wireless device is categorized as a misinformation source. The first indication that the first set of data elements is categorized as misinformation, in some aspects, indicates for the wireless device to not transmit additional data elements unless at least one of a request for a second set of data elements is received or one or more criteria in the set of criteria for requesting reevaluation is met. For example, referring to FIG. 7, the network entity 702 may transmit, and the first UE 704*a* may receive, the set of indications 712 including the first indication that the first set of data elements 706 has been categorized, at 708, as misinformation. The set of indication 712 may further indicate for the first UE 704*a* to not transmit additional data until one of (1) one or more criteria in the set of criteria for requesting reevaluation has been determined at 716 to have been met or (2) a data request 720 has been received.

In some aspects, before transmitting the indication at 1008, the network device may receive the first set of data elements for processing by a machine learning (or other) analysis at the network device (or network entity) associated with the machine learning (or other) analysis. The first set of data elements, in some aspects, may be received from the first wireless device. The first set of data elements, in some aspects, may include one or more of an object bounding box associated with at least the wireless device, a location associated with the wireless device, pose (orientation) information associated with the wireless device, heading information associated with the wireless device, or a gradient update for a federated learning neural network. For example, referring to FIGS. 4-7, a network entity 702 (e.g., a base station 402/602 and/or ML model 406) may receive, and vehicle 412/612 and/or an associated UE 404/604 (corresponding to the first UE 704*a*) may transmit, data 408 (e.g., corresponding to first set of data elements 706) relating to the bounding boxes 512*a*-518*a*, the velocities 512*b*-518*b*, and or the locations 504*a* and/or 504*b*.

In some aspects, the first set of data elements may be based on information received from a set of one or more sensors associated with the wireless device. For example, data from the set of one or more sensors may be processed by a local ML model to derive the first set of data elements. The set of one or more sensors, in some aspects, may be associated with a vehicle that is associated with the wireless device and the set of one or more sensors includes one or more of a RADAR sensor, a LIDAR sensor, image capture sensors, a GNSS, a GPS, or an IMU sensor. In some aspects, the wireless device may be the vehicle and the set of one or more sensors includes sensors associated with a paired and/or associated UE such as a GPS or IMU sensor. For example, referring to FIG. 4, the wireless device may be one of UE 404 or vehicle 412 associated with the UE GPS 432 or vehicle sensors 434, respectively, and may each be associated with the ML model 436.

Furthermore, the network device may categorize the first set of data elements as misinformation before transmitting the indication at 1008. Categorizing the first set of data elements as misinformation, in some aspects, may include adding the first wireless device, or a component of the first wireless device, associated with the first set of data elements to a blacklist including a list of actors or components from which data will be ignored and/or discarded (e.g., data that will not be propagated through a ML model associated with perceptive wireless communication).

Categorizing the first set of data elements as misinformation, in some aspects, may be based on a ML model (e.g., a GAN or VAE) maintained by the network device. In some aspects, the categorization may be made with respect to a particular component of the first set of data elements, such as a GPS or GNSS measurement being categorized as misinformation based on the GPS and/or GNSS measurements from the area associated with the first wireless device being known to the network device to be associated with high-mean and/or high-variance errors. In some aspects, categorizing the first set of data elements as misinformation may include identifying a basis for the categorization as misinformation. The categorization, in some aspects, may be applied to the first UE 704*a* as a whole instead of being applied to individual types of data or components of a first set of data elements. For example, referring to FIG. 7, the network entity 702 may categorize, at 708, the first set of data elements as misinformation.

At 1010, the network device may transmit, and the wireless device may receive, a second indication of a first set of criteria for requesting a reevaluation of the categorization. For example, 1010 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. The set of criteria for requesting a reevaluation of the categorization, in some aspects, may relate to changes in one or more of a confidence of the wireless device in determining the first set of data elements is categorized as misinformation; a change to the fields of view of one or more components associated with the wireless device, a location associated with the wireless device, a velocity associated with the wireless device, or an acceleration associated with the wireless device; an elapsed time since receiving the indication of the set of criteria; or a correction of an identified cause for the first set of data elements being categorized as misinformation. Additional criteria for requesting a reevaluation may be used in accordance with the principles guiding the example criteria above in some aspects. For example, referring to FIG. 7, the first UE 704*a* may receive, and the network entity 702 may transmit, the set of indications 712 including the first indication that the first set of data elements 706 has been categorized, at 708, as misinformation.

The network device may configure the first set of criteria for performing a reevaluation of the categorization before transmitting the second indication at 1010. The set of criteria for requesting reevaluation may relate to changes in one or more of a locally-evaluated confidence (e.g., a threshold confidence value), a field of view, a location, a velocity, an acceleration, an elapsed time since categorization as misinformation (e.g., a minimum expected time for conditions to change), and/or a basis of the categorization of the first set of data elements as misinformation. Additional criteria for requesting a reevaluation may be used in accordance with the principles guiding the example criteria above in some aspects.

The network device, based on categorizing the first set of data elements as misinformation, may transmit a request to at least a second wireless device to provide a third data element for propagating as input for subsequent machine earning analysis. The request for data may be for specific data corresponding to the first set of data elements (or a component of the first set of data elements) that was categorized as misinformation. For example, referring to FIG. 7, the network entity 702 may transmit a request for data 714 to second UE 704*b*.

At 1012, the network device may configure a second set of criteria for performing a reevaluation of the categorization at the network device. For example, 1012 may be performed by CU processor 1412, DU processor 1432, RU processor 1442, network processor 1512, or misinformation mitigation component 199 of FIG. 14 or 15. The second set of criteria for performing a reevaluation may relate to one or more of receiving a request from a different actor, information from a co-located, or paired, actor (e.g., UE 404 paired/co-located with vehicle 412), an elapsed time since categorization as misinformation (e.g., a minimum expected time for conditions to change), and/or a basis of the categorization of the first set of data elements as misinformation. Additional criteria for performing a reevaluation may be used in accordance with the principles guiding the example criteria above in some aspects. For example, referring to FIG. 7, the network entity 702 may, at 710, configure a first set of criteria for requesting reevaluation from the first UE 704*a* and/or a second set of criteria for performing a reevaluation by the network entity 702.

At 1018, the network device may receive a second set of data elements from the first wireless device. For example, 1018 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. The second set of data elements, in some aspects, may be received at a second time after one or more criteria in the first set of criteria for requesting reevaluation or in the second set of criteria for performing a reevaluation have been met. The second set of data elements may be received from the first wireless device at 1018 based on a request transmitted by the network entity. The second set of data elements, in some aspects, may include similar information as included in the first set of data elements. For example, referring to FIG. 7, the network entity 702 may receive, and first UE 704*a* may transmit, second set of data elements 722 based on data request 720.

In some aspects, receiving the second set of data elements at 1018 may be based on determining that one or more criteria in the set of criteria for performing a reevaluation has been met and may transmit a request for the second set of data elements. For example, referring to FIG. 7, the network entity 702 may transmit, and first UE 704*a* may receive, data request 720 based on a determination, at 718, that one or more criteria in the set of criteria for performing a reevaluation has been met.

After the second set of data elements is received at 1018, the network entity may categorize the second set of data elements as misinformation or categorize the second set of data elements as not misinformation (e.g., as accurate and/or reliable information). Categorizing the first set of data elements as misinformation or as not misinformation, in some aspects, may be based on a ML model (e.g., a GAN or VAE) maintained by the network device. For example, in some aspects, a categorization as misinformation may be made with respect to a particular component of the first set of data elements, such as a GPS or GNSS measurement being categorized as misinformation based on the GPS and/or GNSS measurements from the area associated with the first wireless device being known to the network device to be associated with high-mean and/or high-variance errors. Alternatively, a categorization as not information (as accurate and/or reliable information), in some aspects, may be made with respect to the GPS or GNSS based on the GPS and/or GNSS measurements from the area associated with the first wireless device being known to the network device to be associated with low-mean and/or low-variance errors (or not being known to be associated with high-mean and/or high-variance errors). For example, referring to FIG. 7, the network entity 702 may determine, at 724, whether to categorize the second set of data elements 722 as misinformation.

If the network entity categorizes the second set of data elements as not misinformation (e.g., as accurate and/or reliable), the network entity may propagate the second set of data elements as input for the subsequent machine learning procedure based on the categorization of the second set of data elements as not misinformation. The propagation of the second set of data elements, in some aspects, may be related to providing improved coordination between multiple wireless devices (e.g., actors), improved beam management, improved beam blockage prediction, improved beam refinement, or other improved functionality associated with the network entity and/or the wireless devices (e.g., actors). For example, referring to FIG. 7, the network entity 702 may propagate the second set of data elements 722.

The network entity may further indicate whether the second set of data elements is misinformation to the first wireless device. Indicating whether the second set of data elements is categorized as misinformation or as not misinformation, in some aspects, may include transmitting a third indication that the second set of data elements is categorized as not being misinformation. In some aspects, indicating whether the second set of data elements is categorized as misinformation or as not information may include refraining from transmitting a fourth indication that the second set of data elements is categorized as misinformation (e.g., where the first wireless device assumes that the second set of data elements is not misinformation unless a contradictory indication is received). Additionally, or alternatively, indicating whether the second set of data elements is categorized as misinformation or as not information, in some aspects, may include transmitting, for the first wireless device, a fifth indication that the second set of data elements is categorized as misinformation. For example, referring to FIG. 7, the network entity 702 may transmit, and the first UE 704*a* may receive, the categorization indication 726.

Figure 11:
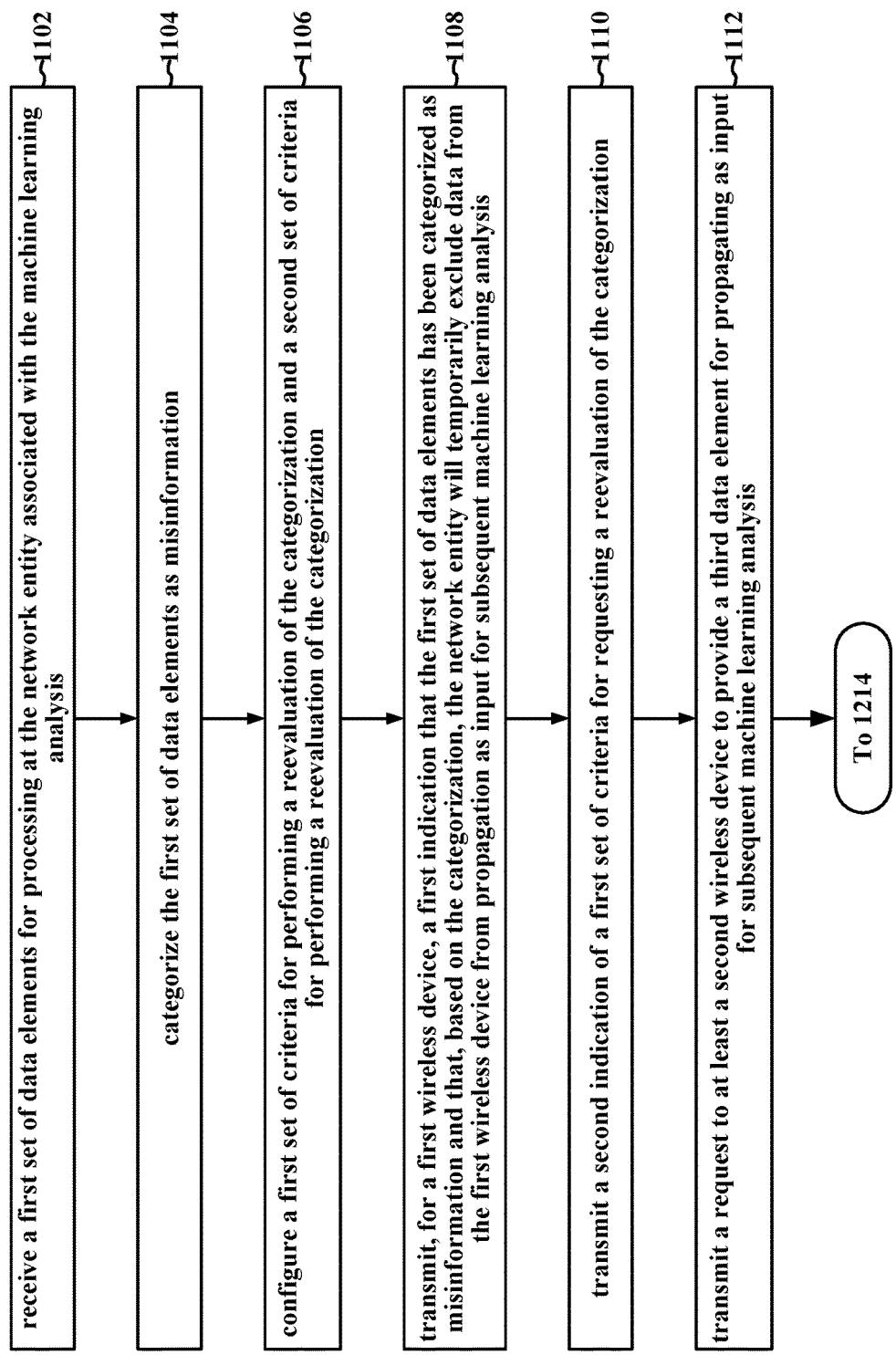
FIG. 11 is a flowchart of a method of wireless communication.

FIG. 11 is a flowchart 1100 of a method of wireless communication. The method may be performed by a network device (e.g., the base station 102, 402, 502, or 602; the network entity 702, 1402, or 1560). At 1102, the network device may receive a first set of data elements for processing at the network device (or network entity) associated with a machine learning analysis. The first set of data elements, in some aspects, may be received from a first wireless device. For example, 1102 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. The first set of data elements, in some aspects, may include one or more of an object bounding box associated with at least the wireless device, a location associated with the wireless device, pose (orientation) information associated with the wireless device, heading information associated with the wireless device, or a gradient update for a federated learning neural network. For example, referring to FIGS. 4-7, a network entity 702 (e.g., a base station 402/602 and/or ML model 406) may receive, and vehicle 412/612 and/or an associated UE 404/604 (corresponding to the first UE 704*a*) may transmit, data 408 (e.g., corresponding to first set of data elements 706) relating to the bounding boxes 512*a*-518*a*, the velocities 512*b*-518*b*, and or the locations 504*a* and/or 504*b*.

In some aspects, the first set of data elements may be based on information received from a set of one or more sensors associated with the wireless device. For example, data from the set of one or more sensors may be processed by a local ML model to derive the first set of data elements. The set of one or more sensors, in some aspects, may be associated with a vehicle that is associated with the wireless device and the set of one or more sensors includes one or more of a RADAR sensor, a LIDAR sensor, image capture sensors, a GNSS, a GPS, or an IMU sensor. The first set of data elements, in some aspects, may include one or more of an object bounding box associated with the first wireless device, a location associated with the first wireless device, pose information associated with the first wireless device, heading information associated with the first wireless device, or a gradient update for a federated learning neural network. In some aspects, the wireless device may be the vehicle and the set of one or more sensors includes sensors associated with a paired and/or associated UE such as a GPS or IMU sensor. For example, referring to FIG. 4, the wireless device may be one of UE 404 or vehicle 412 associated with the UE GPS 432 or vehicle sensors 434, respectively, and may each be associated with the ML model 436.

At 1104, the network device may categorize the first set of data elements as misinformation. For example, 1104 may be performed by CU processor 1412, DU processor 1432, RU processor 1442, network processor 1512, or misinformation mitigation component 199 of FIG. 14 or 15. Categorizing, at 1104, the first set of data elements as misinformation, in some aspects, may include adding the first wireless device, or a component of the first wireless device, associated with the first set of data elements to a blacklist including a list of actors or components from which data will be ignored and/or discarded (e.g., data that will not be propagated through a ML model associated with perceptive wireless communication).

Categorizing the first set of data elements as misinformation at 1104, in some aspects, may be based on a ML model (e.g., a GAN or VAE) maintained by the network device. In some aspects, the categorization may be made with respect to a particular component of the first set of data elements, such as a GPS or GNSS measurement being categorized as misinformation based on the GPS and/or GNSS measurements from the area associated with the first wireless device being known to the network device to be associated with high-mean and/or high-variance errors. In some aspects, categorizing the first set of data elements as misinformation at 1104 may include identifying a basis for the categorization as misinformation. The categorization, in some aspects, may be applied to the first UE 704*a* as a whole instead of being applied to individual types of data or components of a first set of data elements. For example, referring to FIG. 7, the network entity 702 may categorize, at 708, the first set of data elements as misinformation.

At 1106, the network device may configure a first set of criteria for performing a reevaluation of the categorization and a second set of criteria for requesting a reevaluation of the categorization. For example, 1106 may be performed by CU processor 1412, DU processor 1432, RU processor 1442, network processor 1512, or misinformation mitigation component 199 of FIG. 14 or 15. The set of criteria for requesting reevaluation may relate to one or more of a locally-evaluated confidence (e.g., a threshold confidence value), a field of view, a location, a velocity, an acceleration, an elapsed time since categorization as misinformation (e.g., a minimum expected time for conditions to change), and/or a basis of the categorization of the first set of data elements as misinformation. Additional criteria for requesting a reevaluation may be used in accordance with the principles guiding the example criteria above in some aspects. The set of criteria for performing a reevaluation may relate to one or more of receiving a request from a different actor, information from a co-located, or paired, actor (e.g., UE 404 paired/co-located with vehicle 412), an elapsed time since categorization as misinformation (e.g., a minimum expected time for conditions to change), and/or a basis of the categorization of the first set of data elements as misinformation. Additional criteria for performing a reevaluation may be used in accordance with the principles guiding the example criteria above in some aspects. For example, referring to FIG. 7, the network entity 702 may, at 710, configure a first set of criteria for requesting reevaluation from the first UE 704*a* and/or a second set of criteria for performing a reevaluation by the network entity 702. At 1108, the network device may transmit, to a first wireless device, an indication that a first set of data elements transmitted by the wireless device at a first time is categorized as misinformation. For example, 1108 may be performed by CU processor 1412. DU processor 1432, RU processor 1442, transceiver(s) 1446, antenna(s) 1480, network interface 1580, network processor 1512, or misinformation mitigation component 199 of FIG. 14 or 15. The first indication may indicate, in some aspects, that the network device will temporarily exclude data from the wireless device from propagation as input for subsequent machine learning analysis based on the categorization of the first set of data elements as misinformation.

In some aspects, the first indication may include a third indication that the wireless device is categorized as a misinformation source. The first indication that the first set of data elements is categorized as misinformation, in some aspects, indicates for the wireless device to not transmit additional data elements unless at least one of a request for a second set of data elements is received or one or more criteria in the set of criteria for requesting reevaluation is met. For example, referring to FIG. 7, the network entity 702 may transmit, and the first UE 704*a* may receive, the set of indications 712 including the first indication that the first set of data elements 706 has been categorized, at 708, as misinformation. The set of indication 712 may further indicate for the first UE 704*a* to not transmit additional data until one of (1) one or more criteria in the set of criteria for requesting reevaluation has been determined at 716 to have been met or (2) a data request 720 has been received.

At 1110, the network device may transmit, and the wireless device may receive, a second indication of the set of criteria for requesting a reevaluation of the categorization. For example, 1110 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. The set of criteria for requesting a reevaluation of the categorization, in some aspects, may relate to one or more of a confidence of the wireless device in determining the first set of data elements; a change to one or more of a field of view associated with the wireless device, a location associated with the wireless device, a velocity associated with the wireless device, or an acceleration associated with the wireless device; an elapsed time since receiving the indication of the set of criteria; or a correction of an identified cause for the first set of data elements being categorized as misinformation. Additional criteria for requesting a reevaluation may be used in accordance with the principles guiding the example criteria above in some aspects. For example, referring to FIG. 7, the first UE 704*a* may receive, and the network entity 702 may transmit, the set of indications 712 including the first indication that the first set of data elements 706 has been categorized, at 708, as misinformation.

At 1112, the network device may transmit a request to at least a second wireless device to provide a third data element for propagating as input for subsequent machine learning analysis. For example, 1112 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. The request for data may be for specific data corresponding to the first set of data elements (or a component of the first set of data elements) that was categorized as misinformation. For example, referring to FIG. 7, the network entity 702 may transmit a request for data 714 to second UE 704*b*.

Figure 12:
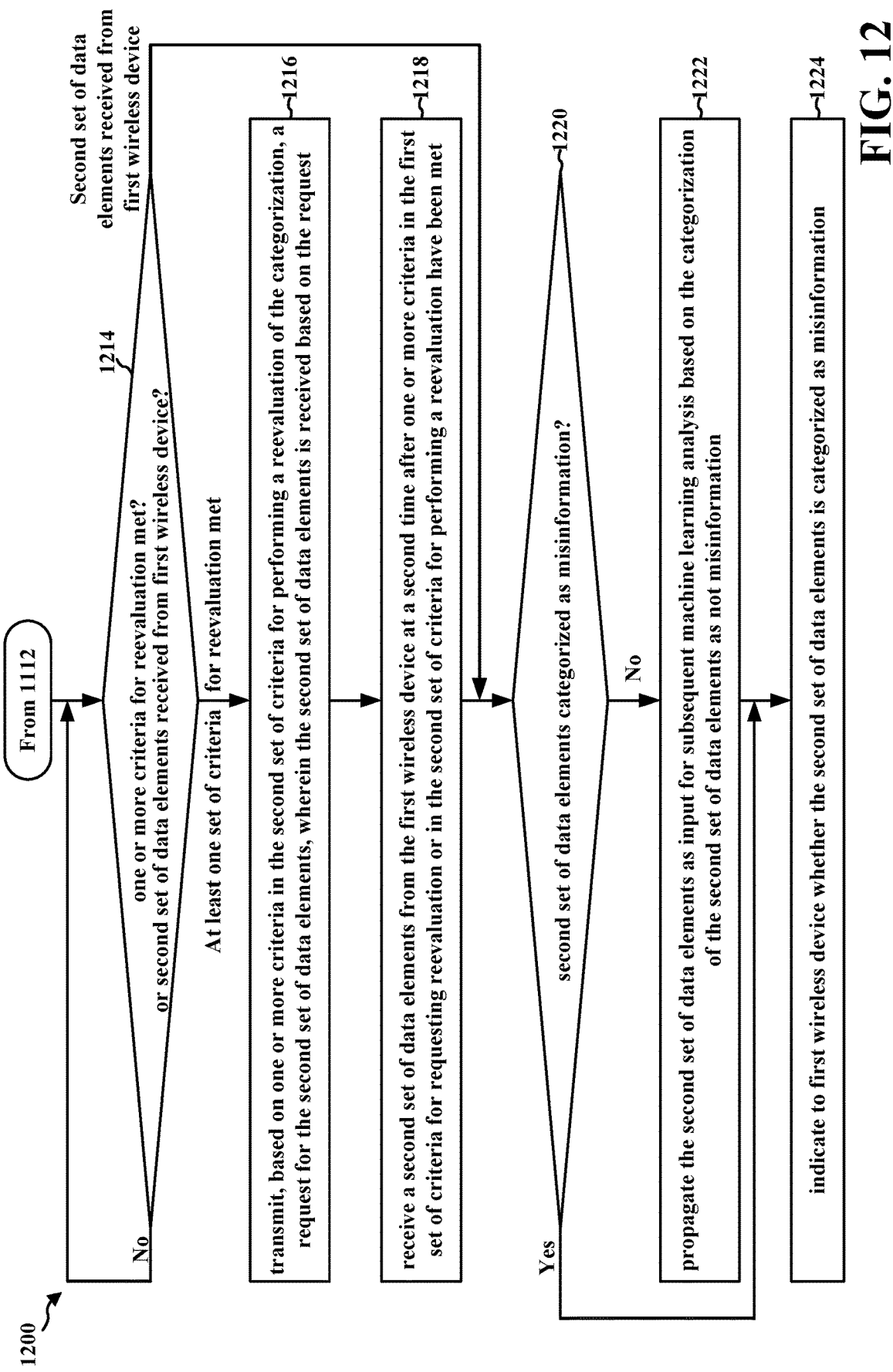
FIG. 12 is a flowchart of a method of wireless communication that is a continuation of the method of wireless communication illustrated in FIG. 11 in accordance with some aspects of the disclosure.

FIG. 12 is a flowchart 1200 of a method of wireless communication that is a continuation of the method of wireless communication illustrated in FIG. 11 in accordance with some aspects of the disclosure. The method may be performed by a network device (e.g., the base station 102, 402, 502, or 602; the network entity 702, 1402, or 1560). At 1214, the network device may determine whether one or more criteria in the set of criteria for performing a reevaluation has been met and/or whether a second set of data elements has been transmitted by the first wireless device. For example, 1214 may be performed by CU processor 1412, DU processor 1432, RU processor 1442, network processor 1512, or misinformation mitigation component 199 of FIG. 14 or 15. For example, referring to FIG. 7, the network entity 702 may determine at 718 whether one or more criteria in the set of criteria for performing a reevaluation has been met and/or may determine if second set of data elements 722 has been received.

If the network device determines, at 1214, that the one or more criteria in the set of criteria for performing reevaluation has not been met and that a second set of data elements has not been received from the first wireless device, the network device may perform a subsequent determination at 1214. The determination at 1214, in some aspects, may be part of a monitoring operation based on the criteria in the set of criteria for requesting a reevaluation. In some aspects, the determinations at 1214 may be performed periodically or based on one or more triggering events.

If the network device determines, at 1214, that one or more criteria in the set of criteria for performing a reevaluation has been met, the network device may transmit, at 1216, a request for the second set of data elements. For example, 1216 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. For example, referring to FIG. 7, the network entity 702 may transmit, and first UE 704a may receive, data request 720 based on the determination at 718.

At 1218, the network device may receive a second set of data elements from the first wireless device. For example, 1218 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. The second set of data elements, in some aspects, may be received at a second time after one or more criteria in the first set of criteria for requesting reevaluation or in the second set of criteria for performing a reevaluation have been met. The second set of data elements may be received from the first wireless device at 1218 based on the request transmitted at 1216. The second set of data elements, in some aspects, may include similar information as included in the first set of data elements. For example, referring to FIG. 7, the network entity 702 may receive, and first UE 704a may transmit, second set of data elements 722 based on data request 720.

After the second set of data elements is received at 1218 or if the network entity determines, at 1214, that the second set of data elements has been received from the first wireless device, the network entity may, at 1220, categorize the second set of data elements as misinformation or categorize the second set of data elements as not misinformation (e.g., as accurate and/or reliable information). For example, 1220 may be performed by CU processor 1412, DU processor 1432, RU processor 1442, network processor 1512, or misinformation mitigation component 199 of FIG. 14 or 15. Categorizing the first set of data elements as misinformation or as not misinformation at 1220, in some aspects, may be based on a ML model (e.g., a GAN or VAE) maintained by the network device. For example, in some aspects, a categorization as misinformation at 1220 may be made with respect to a particular component of the first set of data elements, such as a GPS or GNSS measurement being categorized as misinformation based on the GPS and/or GNSS measurements from the area associated with the first wireless device being known to the network device to be associated with high-mean and/or high-variance errors. Alternatively, a categorization as not information (as accurate and/or reliable information) at 1220, in some aspects, may be made with respect to the GPS or GNSS based on the GPS and/or GNSS measurements from the area associated with the first wireless device being known to the network device to be associated with low-mean and/or low-variance errors (or not being known to be associated with high-mean and/or high-variance errors). For example, referring to FIG. 7, the network entity 702 may determine, at 724, whether to categorize the second set of data elements 722 as misinformation.

If the network entity categorizes, at 1220, the second set of data elements as not misinformation (e.g., as accurate and/or reliable), the network entity may propagate the second set of data elements as input for the subsequent machine learning procedure based on the categorization of the second set of data elements as not misinformation at 1222. For example, 1222 may be performed by CU processor 1412, DU processor 1432, RU processor 1442, network processor 1512, or misinformation mitigation component 199 of FIG. 14 or 15. The propagation of the second set of data elements, in some aspects, may be related to providing improved coordination between multiple wireless devices (e.g., actors), improved beam management, improved beam blockage prediction, improved beam refinement, or other improved functionality associated with the network entity and/or the wireless devices (e.g., actors). For example, referring to FIG. 7, the network entity 702 may propagate the second set of data elements 722.

If the network entity categorizes, at 1220, the second set of data elements as misinformation or, if the network entity categorizes, at 1220, the second set of data elements as not misinformation, the network entity may, at 1224, indicate whether the second set of data elements is misinformation to the first wireless device. For example, 1216 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. Indicating whether the second set of data elements is categorized as misinformation or as not information, in some aspects, may include transmitting a third indication that the second set of data elements is categorized as not being misinformation. In some aspects, indicating whether the second set of data elements is categorized as misinformation or as not information may include refraining from transmitting a fourth indication that the second set of data elements is categorized as misinformation (e.g., where the first wireless device assumes that the second set of data elements is not misinformation unless a contradictory indication is received). Additionally, or alternatively, indicating whether the second set of data elements is categorized as misinformation or as not information, in some aspects, may include transmitting, for the first wireless device, a fifth indication that the second set of data elements is categorized as misinformation. For example, referring to FIG. 7, the network entity 702 may transmit, and the first UE 704a may receive, the categorization indication 726.

Figure 13:
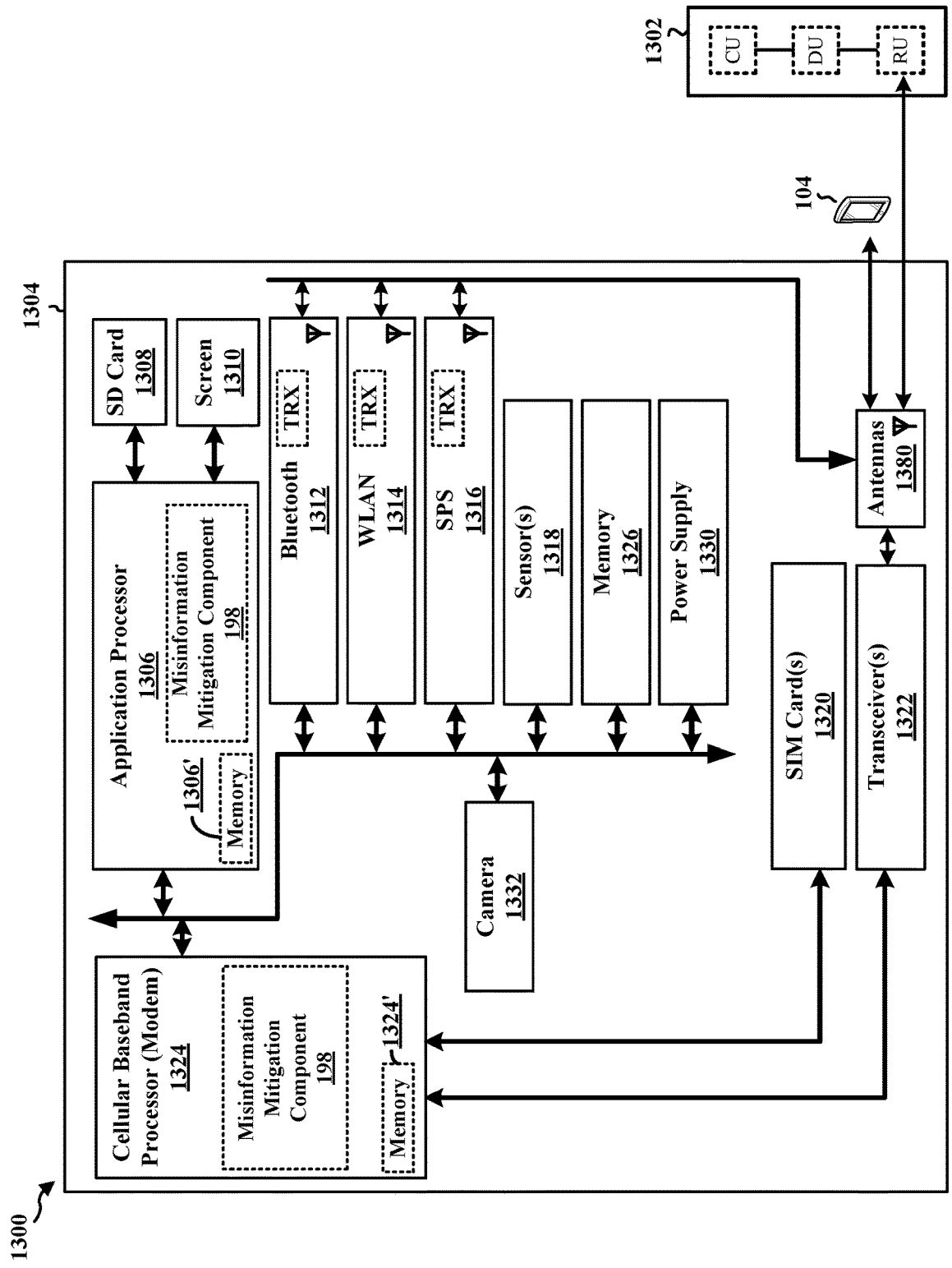
FIG. 13 is a diagram illustrating an example of a hardware implementation for an apparatus.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as an IMU, gyroscope, and/or accelerometer(s); LIDAR, RADAR, sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., sec 350 of FIG. 3) and include the additional modules of the apparatus 1304.

As discussed supra, the misinformation mitigation component 198 is configured to receive, from a network entity associated with a machine learning procedure, a first indication that a first set of data elements transmitted by the wireless device at a first time is categorized as misinformation and that, based on the categorization of the first set of data elements as misinformation, the network entity will temporarily exclude data from the wireless device from propagation as input for a subsequent machine learning procedure. The misinformation mitigation component 198 may further be configured to receive a second indication of a set of criteria for requesting a reevaluation of the categorization and transmit, based on meeting one or more criteria in the set of criteria, a second set of data elements to the network entity at a second time. The misinformation mitigation component 198 may be within the cellular baseband processor 1324, the application processor 1306, or both the cellular baseband processor 1324 and the application processor 1306. The misinformation mitigation component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, includes means for receiving, from a network entity associated with a machine learning procedure, a first indication that a first set of data elements transmitted by the wireless device at a first time is categorized as misinformation and that, based on the categorization of the first set of data elements as misinformation, the network entity will temporarily exclude data from the wireless device from propagation as input for a subsequent machine learning procedure; means for receiving a second indication of a set of criteria for requesting a reevaluation of the categorization; means for transmitting, based on meeting one or more criteria in the set of criteria, a second set of data elements to the network entity at a second time; and means for transmitting the first set of data elements from the wireless device for processing at the network entity associated with the machine learning procedure. The means may be the misinformation mitigation component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
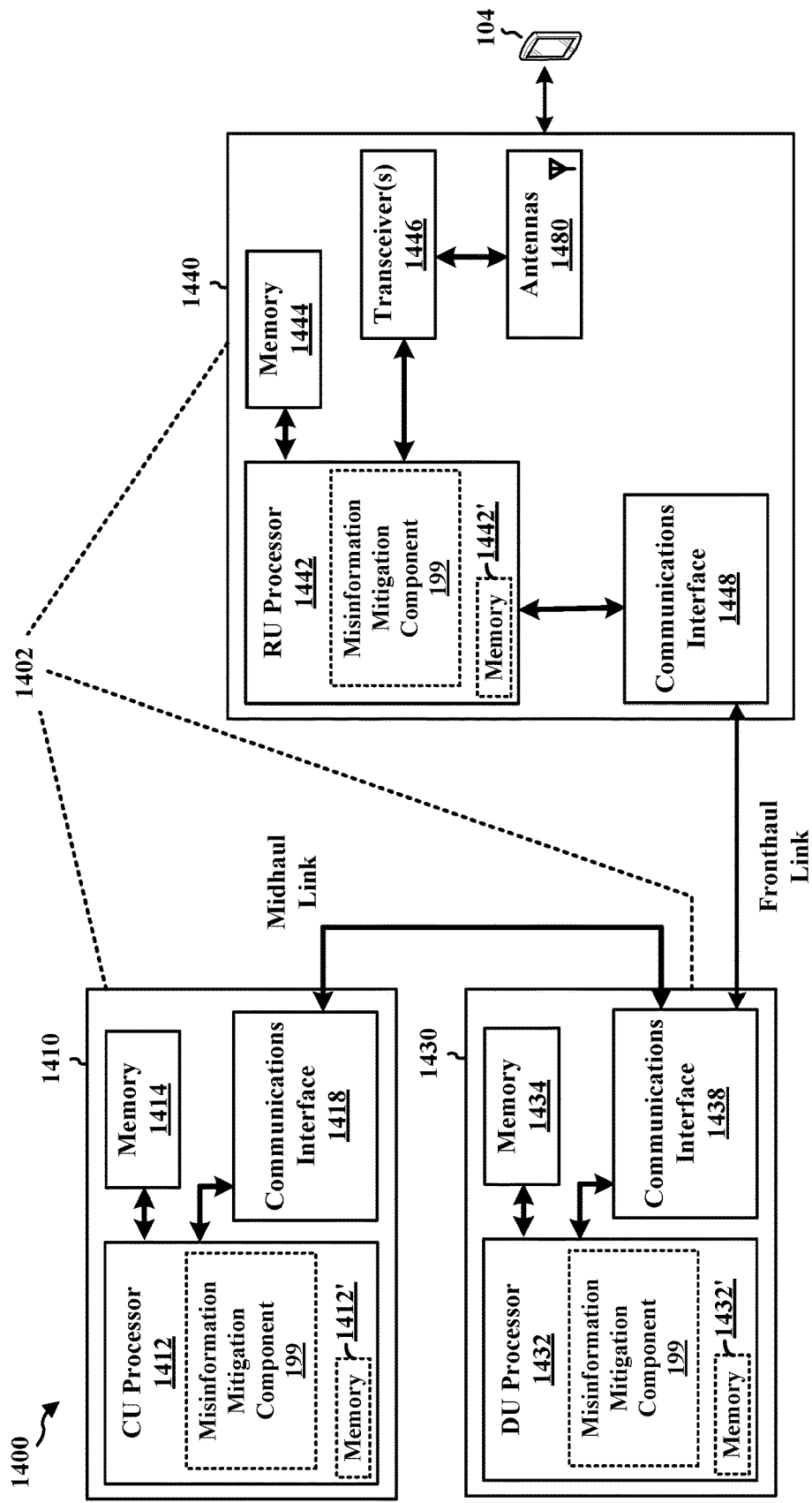
FIG. 14 is a diagram illustrating an example of a hardware implementation for a network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432'. 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the misinformation mitigation component 199 is configured to transmit, for a first wireless device, a first indication that a first set of data elements has been categorized as misinformation and that, based on the categorization of the first set of data elements as misinformation, the network entity will temporarily exclude data from the first wireless device from propagation as input for a subsequent machine learning procedure. The misinformation mitigation component 199 may further be configured to transmit, for the first wireless device, a second indication of a first set of criteria for requesting a reevaluation of the categorization by the first wireless device and configure a second set of criteria for performing a reevaluation of the categorization by the network entity. The misinformation mitigation component 199 may further be configured to receive a second set of data elements from the first wireless device at a second time after one or more criteria in the first set of criteria for requesting reevaluation or in the second set of criteria for performing a reevaluation have been met. The misinformation mitigation component 199 may be within one or more processors of one or more of the CU 1410, DU 1430, and the RU 1440. The misinformation mitigation component 199 may be one or more hardware components specifically configured to carry out the stated processes/ algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for transmitting, for a first wireless device, a first indication that a first set of data elements has been categorized as misinformation and that, based on the categorization of the first set of data elements as misinformation, the network entity will temporarily exclude data from the first wireless device from propagation as input for a subsequent machine learning procedure; means for transmitting, for the first wireless device, a second indication of a first set of criteria for requesting a reevaluation of the categorization by the first wireless device; means for configuring a second set of criteria for performing a reevaluation of the categorization by the network entity; means for receiving a second set of data elements from the first wireless device at a second time after one or more criteria in the first set of criteria for requesting reevaluation or in the second set of criteria for performing a reevaluation have been met; means for transmitting, based on at least one criterion in the set of criteria for performing a reevaluation of the categorization, a request for the second set of data elements, where the second set of data elements is received based on the request; means for categorizing, based on a machine learning procedure of the second set of data elements, the second set of data elements as not misinformation; means for propagating the second set of data elements as input for the subsequent machine learning procedure based on the categorization of the second set of data elements as not misinformation; means for transmitting a request for a second wireless device to provide a third data element for propagating as input for the subsequent machine learning procedure; and means for indicating to the first wireless device whether the second set of data elements is categorized as misinformation by one of: transmitting a third indication that the second set of data elements is categorized as not being misinformation; refraining from transmitting a fourth indication that the second set of data elements is categorized as misinformation; or transmitting, for the first wireless device, a fifth indication that the second set of data elements is categorized as misinformation. The means may be the misinformation mitigation component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Figure 15:
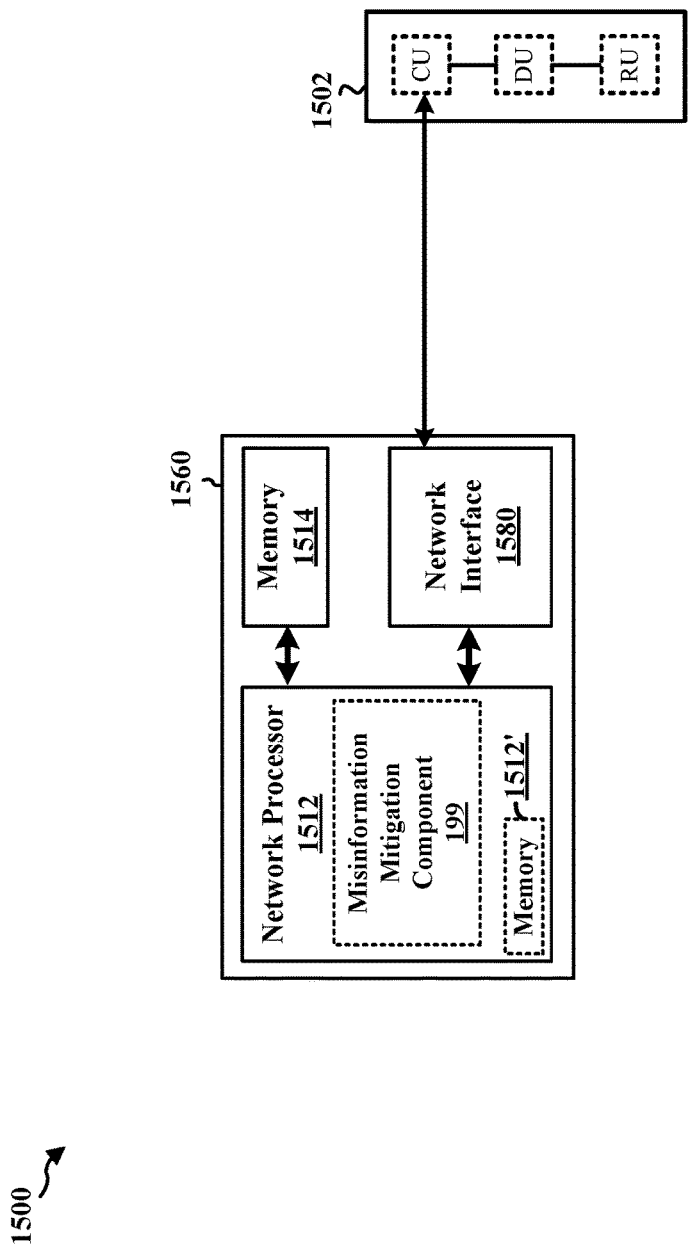
FIG. 15 is a diagram illustrating an example of a hardware implementation for a network entity.

FIG. 15 is a diagram 1500 illustrating an example of a hardware implementation for a network entity 1560. In one example, the network entity 1560 may be within the core network 120. The network entity 1560 may include a network processor 1512. The network processor 1512 may include on-chip memory 1512'. In some aspects, the network entity 1560 may further include additional memory modules 1514. The network entity 1560 communicates via the network interface 1580 directly (e.g., backhaul link) or indirectly (e.g., through a RIC) with the CU 1502. The on-chip memory 1512' and the additional memory modules 1514 may each be considered a computer-readable medium/ memory. Each computer-readable medium/memory may be non-transitory. The processor 1512 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the misinformation mitigation component 199 is configured to transmit, for a first wireless device, a first indication that a first set of data elements has been categorized as misinformation and that, based on the categorization of the first set of data elements as misinformation, the network entity will temporarily exclude data from the first wireless device from propagation as input for a subsequent machine learning procedure. The misinformation mitigation component 199 may further be configured to transmit, for the first wireless device, a second indication of a first set of criteria for requesting a reevaluation of the categorization by the first wireless device and configure a second set of criteria for performing a reevaluation of the categorization by the network entity. The misinformation mitigation component 199 may further be configured to receive a second set of data elements from the first wireless device at a second time after one or more criteria in the first set of criteria for requesting reevaluation or in the second set of criteria for performing a reevaluation have been met. The misinformation mitigation component 199 may be within the processor 1512. The misinformation mitigation component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1560 may include a variety of components configured for various functions. In one configuration, the network entity 1560 includes means for transmitting, for a first wireless device, a first indication that a first set of data elements has been categorized as misinformation and that, based on the categorization of the first set of data elements as misinformation, the network entity will temporarily exclude data from the first wireless device from propagation as input for a subsequent machine learning procedure; means for transmitting, for the first wireless device, a second indication of a first set of criteria for requesting a reevaluation of the categorization by the first wireless device; means for configuring a second set of criteria for performing a reevaluation of the categorization by the network entity; means for receiving a second set of data elements from the first wireless device at a second time after one or more criteria in the first set of criteria for requesting reevaluation or in the second set of criteria for performing a reevaluation have been met; means for transmitting, based on at least one criterion in the set of criteria for performing a reevaluation of the categorization, a request for the second set of data elements, where the second set of data elements is received based on the request; means for categorizing, based on a machine learning procedure of the second set of data elements, the second set of data elements as not misinformation; means for propagating the second set of data elements as input for the subsequent machine learning procedure based on the categorization of the second set of data elements as not misinformation; means for transmitting a request for a second wireless device to provide a third data element for propagating as input for the subsequent machine learning procedure; and means for indicating to the first wireless device whether the second set of data elements is categorized as misinformation by one of: transmitting a third indication that the second set of data elements is categorized as not being misinformation; refraining from transmitting a fourth indication that the second set of data elements is categorized as misinformation; or transmitting, for the first wireless device, a fifth indication that the second set of data elements is categorized as misinformation. The means may be the misinformation mitigation component 199 of the network entity 1560 configured to perform the functions recited by the means.

In some aspects of wireless communication, a communication network may include perceptive wireless communication components. Perceptive wireless communication may relate to communication systems that are assisted by the perception of the physical environment/world. The perception of the physical environment/world, in some aspects, includes measurement data and machine learning feature data gathered from vehicular sensors, e.g., RADAR, LIDAR, cameras, GNSS, IMU sensors. Communications tasks that benefit from perception, in some aspects, include beam management, beam blockage prediction, beam refinement, etc.

As a non-limiting example of perception wireless communication, sensing-related measurement data and feature data gathered from vehicles, may be combined with communications-related measurements and feature data to improve and/or refine the quality and/or efficiency of the communication systems. Perceptive wireless communication, thus, may involve reliable coordination, at multiple stages, between multiple independent agents/actors. In some aspects, the actors may include pedestrian UEs, in-vehicle UEs, vehicles, vehicular sensors, GPS devices, and/or other similar devices providing data for processing by (or propagating through) one or more AI/ML training/inference servers.

Rogue actors (actors whose information is misleading, incorrect, inaccurate, mistaken, misleading, corrupted, and/or deceptive) can introduce or cause error propagation at multiple stages of a perceptive wireless communication procedure. The misleading or incorrect information (e.g., misinformation) may include one or more of raw sensing data, bounding boxes and other features extracted from onboard ML models, UE/wireless device location, UE/wireless device orientation/velocity, and/or beam measurements at the UE. Therefore, one or more rogue actors can severely degrade the benefits from coordination among multiple actors, most of which may not be rogue actors. Robustness to such rogue actors may improve the usefulness (e.g., accuracy) of the perceptive wireless communication.

For a network comprising a number of network nodes spread over a large geographic area, maintaining a centralized list (or identification) of devices providing incorrect and/or misleading information for the large geographic area may demand and/or consume too many resources (e.g., too much storage space and/or memory or too much bandwidth for transmitting the information regarding the list or identification of devices). Accordingly, in some aspect of the disclosure, a method and/or apparatus is provided for maintaining manageable lists (e.g., lists that consume an acceptable amount of memory or bandwidth when transmitting information related to the list) of devices providing incorrect and/or misleading information while maintaining the integrity and/or accuracy of the perceptive wireless communication. The method and/or apparatus, in some aspects, uses a combination of centralized (e.g., for limited geographical regions) and local (e.g., at particular network elements or devices) access lists (or identification) of devices that have been classified as providing incorrect and/or misleading information.

For an honest rogue actor, the errors (e.g., misinformation) may persist for an extended time period (e.g., a 'misinformation period' having a duration of seconds to minutes) but may ultimately be temporary. The perceptive wireless communication system, in accordance with some aspects of the disclosure, may be provided with a method to temporarily exclude and/or discard data from such honest rogue actors during the duration of the misinformation period while accepting/propagating data from the honest actors after the misinformation period is over and the data from the actor is expected to be accurate and/or reliable again. The method may avoid permanently blacklisting, revoking the access permissions, or changing the access key for the actor for long periods of time or permanently, which could lead to (1) disregarding all future information from the actor (including accurate and/or reliable information) and (2) a state in which most, or substantially all, of the actors are blacklisted such that the network stops receiving data from the actors even after the information becomes accurate and/or reliable. Either of these outcomes may reduce the usefulness of the perceptive wireless communication system. However, constant reevaluation may increase overhead for the actors and the network. Accordingly, in some aspects of the disclosure, the reevaluation may be based on sets of criteria that, when satisfied, are likely to be associated with an end of a misinformation period as discussed above.

Figure 16:
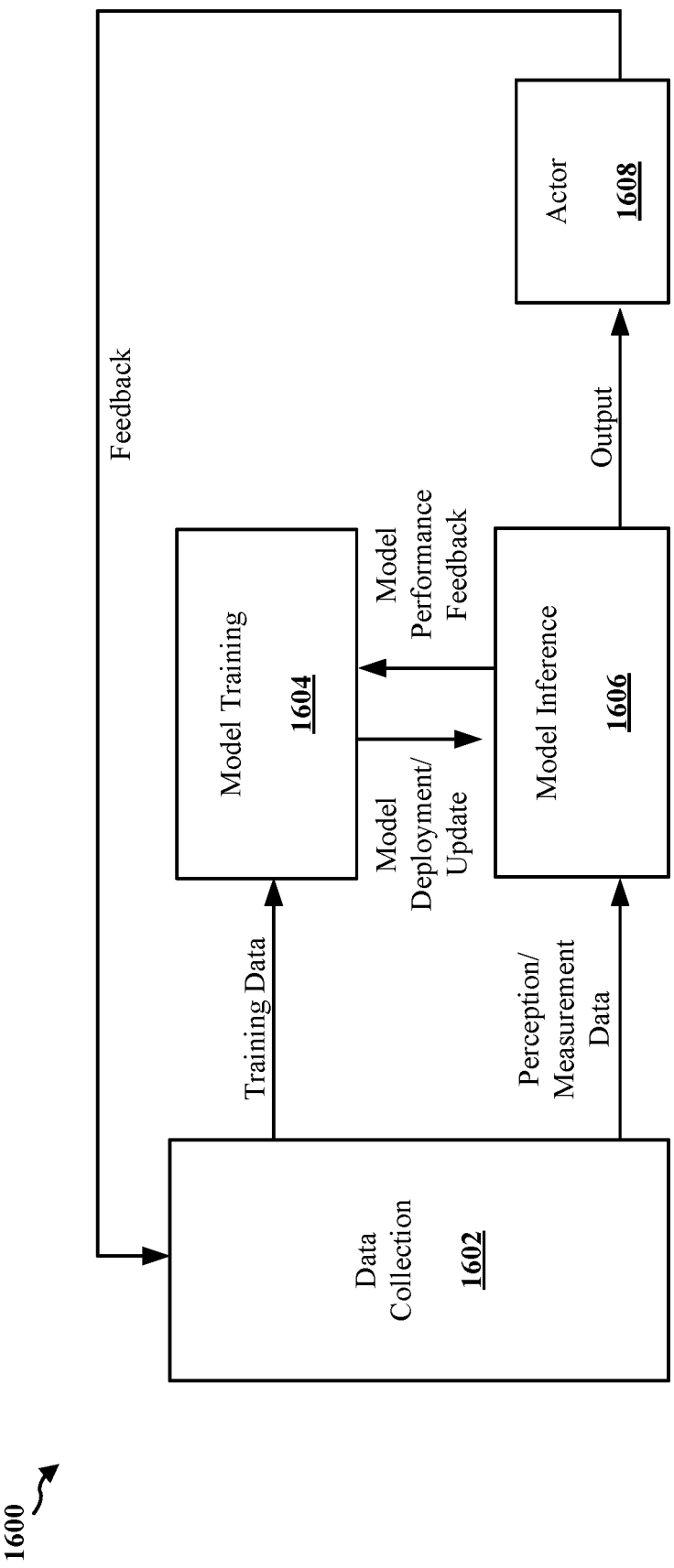
FIG. 16 illustrates example aspects of an AI/ML algorithm for a method of wireless communication in accordance with aspects presented herein.

FIG. 16 is an example of the AI/ML algorithm 1600 of a method of wireless communication. The AI/ML algorithm 1600 may include various functions including a data collection 1602, a model training function 1604, a model inference function 1606, and an actor 1608.

The data collection 1602 may be a function that provides input data to the model training function 1604 and the model inference function 1606. The data collection 1602 function may include any form of data preparation, and it may not be specific to the implementation of the AI/ML algorithm (e.g., data pre-processing and cleaning, formatting, and transformation). The examples of input data may include, but not limited to, measurements, and perception information, from entities including UEs or network nodes, feedback from the actor 1608, output from another AI/ML model. The data collection 1602 may include training data, which refers to the data to be sent as the input for the AI/ML model training function 1604, and inference data, which refers to be sent as the input for the AI/ML model inference function 1606.

The model training function 1604 may be a function that performs the ML model training, validation, and testing, which may generate model performance metrics as part of the model testing procedure. The model training function 1604 may also be responsible for data preparation (e.g., data pre-processing and cleaning, formatting, and transformation) based on the training data delivered or received from the data collection 1602 function. The model training function 1604 may deploy or update a trained, validated, and tested AI/ML model to the model inference function 1606, and receive a model performance feedback from the model inference function 1606.

The model inference function 1606 may be a function that provides the AI/ML model inference output (e.g., predictions or decisions). The model inference function 1606 may also perform data preparation (e.g., data pre-processing and cleaning, formatting, and transformation) based on the inference data delivered from the data collection 1602 function. The output of the model inference function 1606 may include the inference output of the AI/ML model produced by the model inference function 1606. The details of the inference output may be use-case specific. As an example, the output may include an identification of actors provide disinformation or misinformation, such as described in connection with any of FIGS. 5-13.

The model performance feedback may refer to information derived from the model inference function 1606 that may be suitable for improvement of the AI/ML model trained in the model training function 1604. The feedback from the actor 1608 or other network entities (via the data collection 1602 function) may be implemented for the model inference function 1606 to create the model performance feedback.

The actor 1608 may be a function that receives the output from the model inference function 1606 and triggers or performs corresponding actions. The actor may trigger actions directed to network entities including the other network entities or itself. The actor 1608 may also provide a feedback information that the model training function 1604 or the model interference function 1606 to derive training or inference data or performance feedback. The feedback may be transmitted back to the data collection 1602.

The network may use machine-learning algorithms, deep-learning algorithms, neural networks, reinforcement learning, regression, boosting, or advanced signal processing methods for aspects of wireless communication including the identification of actors providing disinformation or misinformation.

In some aspects described herein, the network may train one or more neural networks to learn dependence of measured qualities on individual parameters. Among others, examples of machine learning models or neural networks that may be comprised in the network entity include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; Bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivates, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. An output of one node is connected as the input to another node. Connections between nodes may be referred to as edges, and weights may be applied to the connections/edges to adjust the output from one node that is applied as input to another node. Nodes may apply thresholds in order to determine whether, or when, to provide output to a connected node. The output of each node may be calculated as a non-linear function of a sum of the inputs to the node. The neural network may include any number of nodes and any type of connections between nodes. The neural network may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse layers multiple times.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

In an aspect of the disclosure, a method, a computer-readable medium, and an apparatus are provided. The apparatus in certain aspects may be configured to receive, from a network entity associated with a machine learning procedure, a first indication that a first set of data elements transmitted by the wireless device at a first time is categorized as misinformation and that, based on the first set of data elements being categorized, the network entity will temporarily exclude data from the wireless device from propagation as input for a subsequent machine learning procedure. The apparatus may further be configured to receive a second indication of a set of criteria for requesting a reevaluation of the categorization and transmit, based on meeting one or more criteria in the set of criteria, a second set of data elements to the network entity at a second time.

In an aspect of the disclosure, a method, a computer-readable medium, and an apparatus are provided. The apparatus in certain aspects may be configured to transmit, for a first wireless device, a first indication that a first set of data elements has been categorized as misinformation and that, based on the first set of data elements being categorized, the network entity will temporarily exclude data from the first wireless device from propagation as input for a subsequent machine learning procedure. The apparatus may further be configured to transmit, for the first wireless device, a second indication of a first set of criteria for requesting a reevaluation of the categorization by the first wireless device and configure a second set of criteria for performing a reevaluation of the categorization by the network entity. The apparatus may further be configured to receive a second set of data elements from the first wireless device at a second time after one or more criteria in the first set of criteria for requesting reevaluation or in the second set of criteria for performing a reevaluation have been met.

Aspect 1 is a method of wireless communication at a UE, including receiving, from a network entity associated with a machine learning procedure, a first indication that a first set of data elements transmitted by the wireless device at a first time is categorized as misinformation and that, based on the first set of data elements being categorized as the misinformation, the network entity will temporarily exclude data from the wireless device from propagation as input for a subsequent machine learning procedure; receiving a second indication of a set of criteria for requesting a reevaluation of the categorization; and transmitting, based on meeting one or more criteria in the set of criteria, a second set of data elements to the network entity at a second time.

Aspect 2 is the method of aspect 1, further including transmitting, based on meeting the one or more criteria in the set of criteria, a third indication of a request for the reevaluation to the network entity; and receiving, based on the third indication of the request for the reevaluation and before transmitting the second set of data elements, a fourth indication from the network entity for the wireless device to transmit the second set of data elements.

Aspect 3 is the method of any of aspects 1 or 2, where the first set of data elements includes one or more of feature sets or raw data information received from a set of sensors associated with the wireless device.

Aspect 4 is the method of aspect 3, where the wireless device is a vehicle associated with a set of sensors including one or more of a radio detection and ranging (RADAR) sensor, a light detection and ranging (LiDAR) sensor, image capture sensors, a global navigation satellite system (GNSS), or an inertial measurement unit (IMU) sensor and the first set of data elements includes one or more of object bounding boxes derived from raw data from the set of sensors associated with the wireless device, wireless channel information associated with the wireless device, global positioning information, a speed associated with the wireless device, an acceleration associated with the wireless device, pose information associated with the wireless device, heading information associated with the wireless device, or a gradient update for a federated learning neural network.

Aspect 5 is the method of aspect 3, where the first wireless device is a user equipment (UE) and the first set of data includes one or more of wireless channel information or global positioning information Aspect 6 is the method of any of aspects 3 or 5, where the wireless device is a user equipment (UE) associated with a vehicle having a group of sensors including one or more of a radio detection and ranging (RADAR) sensor, a light detection and ranging (LiDAR) sensor, image capture sensors, a global navigation satellite system (GNSS), or an inertial measurement unit (IMU) sensor and the first set of data elements further includes information collected by the group of sensors associated with the vehicle.

Aspect 7 is the method of any of aspects 1 to 6, where the first indication that the first set of data elements is categorized as misinformation includes a third indication that the wireless device is temporarily categorized as a misinformation source.

Aspect 8 is the method of any of aspects 1 to 7, where the set of criteria relates to one or more of: a measure of confidence of the wireless device in determining the first set of data elements; a change in the measure of a confidence of the wireless device in determining the first set of data elements; a change to one or more of a field of view associated with sensors associated with the wireless device; a location associated with the wireless device; a velocity associated with the wireless device; an acceleration associated with the wireless device; an elapsed time since receiving the second indication of the set of criteria; or a correction of a known cause for the first set of data elements being categorized as misinformation.

Aspect 9 is the method of any of aspects 1 to 8, further including transmitting the first set of data elements from the wireless device for processing at the network entity associated with the machine learning procedure.

Aspect 10 is the method of any of aspects 1 to 9, where the first indication that the first set of data elements is categorized as misinformation indicates for the wireless device to not transmit additional data elements unless at least one of a request for the second set of data elements is received or at least one criterion in the set of criteria is met.

Aspect 11 is the method of any of aspects 1 to 10, where the second set of data elements is (1) not categorized as misinformation and (2) is propagated as input for the subsequent machine learning procedure.

Aspect 12 is a method of wireless communication at a network entity, including transmitting, for a first wireless device, a first indication that a first set of data elements has been categorized as misinformation and that, based on the first set of data elements being categorized as misinformation, the network entity will temporarily exclude data from the first wireless device from propagation as input for a subsequent machine learning procedure; transmitting, for the first wireless device, a second indication of a first set of criteria for requesting a reevaluation of the categorization by the first wireless device; configuring a second set of criteria for performing a reevaluation of the categorization by the network entity; and receiving a second set of data elements from the first wireless device at a second time after one or more criteria in the first set of criteria for requesting reevaluation or in the second set of criteria for performing a reevaluation have been met.

Aspect 13 is the method of aspect 12, where the subsequent machine learning procedure is at least one of a communication-related procedure or an application-specific procedure.

Aspect 14 is the method of any of aspects 12 and 13, further including transmitting, based on at least one criterion in the second set of criteria for performing a reevaluation of the categorization, a request for the second set of data elements, where the second set of data elements is received based on the request.

Aspect 15 is the method of any of aspects 10 to 14, further including categorizing, based on a machine learning procedure associated with the second set of data elements, the second set of data elements as not misinformation; and propagating the second set of data elements as input for the subsequent machine learning procedure based on the categorization of the second set of data elements as not misinformation.

Aspect 16 is the method of any of aspects 12 to 15, further including transmitting a request for a second wireless device to provide a third data element for propagating as input for the subsequent machine learning procedure.

Aspect 17 is the method of any of aspects 12 to 16, where the second set of criteria for performing a reevaluation of the categorization relates to one or more of a request from a second wireless device for association with the first wireless device, an elapsed time since transmitting the second indication of the second set of criteria, a third indication of a configuration change at the first wireless device from a co-located third wireless device, or a correction of an identified cause for the first set of data elements being categorized as misinformation.

Aspect 18 is the method of any of aspects 12 to 17, where the first set of data elements includes one or more of an object bounding box associated with the first wireless device, a location associated with the first wireless device, pose information associated with the first wireless device, heading information associated with the first wireless device, or a gradient update for a federated learning neural network.

Aspect 19 is the method of any of aspects 12 to 18, where the first indication that the first set of data elements is categorized as misinformation includes a third indication that the first wireless device is categorized as a misinformation source.

Aspect 20 is the method of any of aspects 12 to 19, further including indicating to the first wireless device whether the second set of data elements is categorized as misinformation by one of: transmitting a third indication that the second set of data elements is categorized as not being misinformation; refraining from transmitting a fourth indication that the second set of data elements is categorized as misinformation; or transmitting, for the first wireless device, a fifth indication that the second set of data elements is categorized as misinformation.

Aspect 21 is the method of any of aspects 12 to 20, further including receiving, based on one or more criteria in the first set of criteria being met at the first wireless device, a third indication of a request for the reevaluation from the first wireless device; and transmitting, based on the third indication of the request for the reevaluation and before receiving the second set of data elements, a fourth indication to the first wireless device for the first wireless device to transmit the second set of data elements.

Aspect 22 is an apparatus for wireless communication at a device including a memory and at least one processor coupled to the memory and, based at least in part on information stored in the memory, the at least one processor is configured to implement any of aspects 1 to 21.

Aspect 23 is the method of aspect 22, further including a transceiver or an antenna coupled to the at least one processor.

Aspect 24 is an apparatus for wireless communication at a device including means for implementing any of aspects 1 to 21.

Aspect 25 is a computer-readable medium (e.g., a non-transitory computer-readable medium) storing computer executable code, where the code when executed by a processor causes the processor to implement any of aspects 1 to 21.

What is claimed is:

1. An apparatus for wireless communication at a wireless device, comprising:
a memory; and
at least one processor coupled to the memory and, based at least in part on information stored in the memory, the at least one processor is configured to:
receive, from a network entity associated with a machine learning procedure, a first indication that a first set of data elements transmitted by the wireless device at a first time is categorized as misinformation and that, based on the first set of data elements being categorized as the misinformation, the network entity will temporarily exclude data from the wireless device from propagation as input for a subsequent machine learning procedure;
receive a second indication of a set of criteria for requesting a reevaluation of the categorization; and
transmit, based on meeting one or more criteria in the set of criteria, a second set of data elements to the network entity at a second time.

2. The apparatus of claim 1, further comprising a transceiver or an antenna coupled to the at least one processor, wherein the at least one processor is further configured to:
transmit, based on meeting the one or more criteria in the set of criteria, a third indication of a request for the reevaluation to the network entity; and
receive, based on the third indication of the request for the reevaluation and before transmitting the second set of data elements, a fourth indication from the network entity for the wireless device to transmit the second set of data elements.

3. The apparatus of claim 1, wherein the first set of data elements comprises one or more of feature sets or raw data information received from a set of sensors associated with the wireless device.

4. The apparatus of claim 3, wherein the wireless device is a vehicle associated with the set of sensors comprising one or more of a radio detection and ranging (RADAR) sensor, a light detection and ranging (LiDAR) sensor, image capture sensors, a global navigation satellite system (GNSS), or an inertial measurement unit (IMU) sensor and the first set of data elements comprises one or more of object bounding boxes derived from raw data from the set of sensors associated with the wireless device, wireless channel information associated with the wireless device, global positioning information, a speed associated with the wireless device, an acceleration associated with the wireless device, pose information associated with the wireless device, heading information associated with the wireless device, or a gradient update for a federated learning neural network.

5. The apparatus of claim 3, wherein the wireless device is a user equipment (UE) and the first set of data elements comprises one or more of wireless channel information or global positioning information.

6. The apparatus of claim 3, wherein the wireless device is a user equipment (UE) associated with a vehicle having a group of sensors comprising one or more of a radio detection and ranging (RADAR) sensor, a light detection and ranging (LiDAR) sensor, image capture sensors, a global navigation satellite system (GNSS), or an inertial measurement unit (IMU) sensor and the first set of data elements further comprises first information collected by the group of sensors associated with the vehicle.

7. The apparatus of claim 1, wherein the first indication that the first set of data elements is categorized as the misinformation comprises a third indication that the wireless device is temporarily categorized as a misinformation source.

8. The apparatus of claim 1, wherein the set of criteria relates to one or more of:
a measure of confidence of the wireless device in determining the first set of data elements;

a change in the measure of confidence of the wireless device in determining the first set of data elements;

a change to one or more of a field of view associated with sensors associated with the wireless device;

a location associated with the wireless device;

a velocity associated with the wireless device;

an acceleration associated with the wireless device;

an elapsed time since receiving the second indication of the set of criteria; or a correction of a known cause for the first set of data elements being categorized as the misinformation.

9. The apparatus of claim 1, wherein the at least one processor is further configured to:

transmit the first set of data elements from the wireless device for processing at the network entity associated with the machine learning procedure.

10. The apparatus of claim 1, wherein the first indication that the first set of data elements is categorized as the misinformation indicates for the wireless device to not transmit additional data elements unless at least one of a request for the second set of data elements is received or at least one criterion in the set of criteria is met.

11. The apparatus of claim 1, wherein the second set of data elements is (1) not categorized as the misinformation and (2) is propagated as input for the subsequent machine learning procedure.

12. An apparatus for wireless communication at a network entity, comprising:

a memory; and at least one processor coupled to the memory and, based at least in part on information stored in the memory, the at least one processor is configured to:

transmit, for a first wireless device, a first indication that a first set of data elements has been categorized as misinformation and that, based on the first set of data elements being categorized as the misinformation, the network entity will temporarily exclude data from the first wireless device from propagation as input for a subsequent machine learning procedure;

transmit, for the first wireless device, a second indication of a first set of criteria for requesting a reevaluation of the categorization by the first wireless device;

configure a second set of criteria for performing the reevaluation of the categorization by the network entity; and receive a second set of data elements from the first wireless device at a second time after one or more criteria in the first set of criteria for requesting the reevaluation or in the second set of criteria for performing the reevaluation have been met.

13. The apparatus of claim 12, further comprising a transceiver or an antenna coupled to the at least one processor, wherein the at least one processor is further configured to:

receive, based on one or more criteria in the first set of criteria being met at the first wireless device, a third indication of a request for the reevaluation from the first wireless device; and transmit, based on the third indication of the request for the reevaluation and before receiving the second set of data elements, a fourth indication to the first wireless device for the first wireless device to transmit the second set of data elements.

14. The apparatus of claim 12, wherein the subsequent machine learning procedure is at least one of a communication-related procedure or an application-specific procedure.

15. The apparatus of claim 12, wherein the at least one processor is further configured to:

transmit, based on at least one criterion in the second set of criteria for performing the reevaluation of the categorization, a request for the second set of data elements, wherein the second set of data elements is received based on the request.

16. The apparatus of claim 12, wherein the at least one processor is further configured to:

categorize, based on a machine learning procedure associated with the second set of data elements, the second set of data elements as not misinformation; and propagate the second set of data elements as input for the subsequent machine learning procedure based on the categorization of the second set of data elements as not misinformation.

17. The apparatus of claim 12, further comprising a transceiver or an antenna coupled to the at least one processor, wherein the at least one processor is further configured to:

transmit a request for a second wireless device to provide a third data element for propagating as input for the subsequent machine learning procedure.

18. The apparatus of claim 12, wherein the second set of criteria for performing the reevaluation of the categorization relates to one or more of a request from a second wireless device for association with the first wireless device, an elapsed time since transmitting the second indication of the second set of criteria, a third indication of a configuration change at the first wireless device from a co-located third wireless device, or a correction of an identified cause for the first set of data elements being categorized as the misinformation.

19. The apparatus of claim 12, wherein the first set of data elements comprises one or more of an object bounding box associated with the first wireless device, a location associated with the first wireless device, pose information associated with the first wireless device, heading information associated with the first wireless device, or a gradient update for a federated learning neural network.

20. The apparatus of claim 12, wherein the first indication that the first set of data elements is categorized as the misinformation comprises a third indication that the first wireless device is categorized as a misinformation source.

21. The apparatus of claim 12, wherein to indicate to the first wireless device whether the second set of data elements is categorized as the misinformation, the at least one processor is configured to:

transmit a third indication that the second set of data elements is categorized as not being the misinformation;

refrain from transmitting a fourth indication that the second set of data elements is categorized as the misinformation; or transmit, for the first wireless device, a fifth indication that the second set of data elements is categorized as the misinformation.

22. A method of wireless communication at a wireless device, comprising:

receiving, from a network entity associated with a machine learning procedure, a first indication that a first set of data elements transmitted by the wireless device at a first time is categorized as misinformation and that, based on the first set of data elements being categorized as the misinformation, the network entity will temporarily exclude data from the wireless device from propagation as input for a subsequent machine learning procedure;

receiving a second indication of a set of criteria for requesting a reevaluation of the categorization; and transmitting, based on meeting one or more criteria in the set of criteria, a second set of data elements to the network entity at a second time.

23. The method of claim 22, further comprising:
transmitting, based on meeting the one or more criteria in the set of criteria, a third indication of a request for the reevaluation to the network entity; and
receiving, based on the third indication of the request for the reevaluation and before transmitting the second set of data elements, a fourth indication from the network entity for the wireless device to transmit the second set of data elements.

24. The method of claim 22, wherein the set of criteria relates to one or more of:
a measure of confidence of the wireless device in determining the first set of data elements;
a change in the measure of confidence of the wireless device in determining the first set of data elements;
a change to one or more of a field of view associated with sensors associated with the wireless device;
a location associated with the wireless device;
a velocity associated with the wireless device;
an acceleration associated with the wireless device;
an elapsed time since receiving the second indication of the set of criteria; or
a correction of a known cause for the first set of data elements being categorized as the misinformation.

25. The method of claim 22, wherein the wireless device is associated with a set of sensors comprising one or more of a radio detection and ranging (RADAR) sensor, a light detection and ranging (LiDAR) sensor, image capture sensors, a global navigation satellite system (GNSS), or an inertial measurement unit (IMU) sensor and the first set of data elements comprises one or more of object bounding boxes derived from raw data from the set of sensors associated with the wireless device, wireless channel information associated with the wireless device, global positioning information, a speed associated with the wireless device, an acceleration associated with the wireless device, pose information associated with the wireless device, heading information associated with the wireless device, or a gradient update for a federated learning neural network.

26. The method of claim 22, wherein the first indication that the first set of data elements is categorized as the misinformation indicates for the wireless device to not transmit additional data elements unless at least one of a request for the second set of data elements is received or at least one criterion in the set of criteria is met.

27. A method of wireless communication at a network entity, comprising:
transmitting, for a first wireless device, a first indication that a first set of data elements has been categorized as misinformation and that, based on the first set of data elements being categorized as the misinformation, the network entity will temporarily exclude data from the first wireless device from propagation as input for a subsequent machine learning procedure;
transmitting, for the first wireless device, a second indication of a first set of criteria for requesting, from the first wireless device, a reevaluation of the categorization;
configuring a second set of criteria for performing the reevaluation of the categorization by the network entity; and
receiving a second set of data elements from the first wireless device at a second time after one or more criteria in the first set of criteria for requesting the reevaluation or in the second set of criteria for performing the reevaluation have been met.

28. The method of claim 27, further comprising:
transmitting, based on at least one criterion in the second set of criteria for performing the reevaluation of the categorization, a request for the second set of data elements, wherein the second set of data elements is received based on the request;
categorizing, based on a machine learning procedure associated with the second set of data elements, the second set of data elements as not misinformation; and
propagating the second set of data elements as input for the subsequent machine learning procedure based on the categorization of the second set of data elements as not misinformation.

29. The method of claim 27, wherein the second set of criteria for performing the reevaluation of the categorization relates to one or more of a request from a second wireless device for association with the first wireless device, an elapsed time since transmitting the second indication of the second set of criteria, a third indication of a configuration change at the first wireless device from a co-located third wireless device, or a correction of an identified cause for the first set of data elements being categorized as the misinformation.

30. The method of claim 27, further comprising indicating to the first wireless device whether the second set of data elements is categorized as the misinformation by one of:
transmitting a third indication that the second set of data elements is categorized as not being the misinformation;
refraining from transmitting a fourth indication that the second set of data elements is categorized as the misinformation; or
transmitting, for the first wireless device, a fifth indication that the second set of data elements is categorized as the misinformation.

* * * * *